United States Patent
Kishimoto

(10) Patent No.: US 11,232,740 B1
(45) Date of Patent: Jan. 25, 2022

(54) CORRECTION IMAGE GENERATION SYSTEM, IMAGE CONTROL METHOD, IMAGE CONTROL PROGRAM, AND RECORDING MEDIUM

(71) Applicant: SAKAI DISPLAY PRODUCTS CORPORATION, Sakai (JP)

(72) Inventor: Katsuhiko Kishimoto, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 17/417,758

(22) PCT Filed: Dec. 25, 2018

(86) PCT No.: PCT/JP2018/047672
§ 371 (c)(1),
(2) Date: Jun. 24, 2021

(87) PCT Pub. No.: WO2020/136732
PCT Pub. Date: Jul. 2, 2020

(51) Int. Cl.
*G09G 3/20* (2006.01)

(52) U.S. Cl.
CPC ... *G09G 3/2007* (2013.01); *G09G 2320/0276* (2013.01); *G09G 2320/043* (2013.01); *G09G 2320/0626* (2013.01)

(58) Field of Classification Search
CPC .................................................. G09G 3/2007
See application file for complete search history.

(56) References Cited

U.S. PATENT DOCUMENTS

| 7,227,519 B1 | 6/2007 | Kawase et al. |
| 2002/0041364 A1 | 4/2002 | Ioka |
| 2010/0164977 A1 | 7/2010 | Miyazawa |
| 2017/0186350 A1 | 6/2017 | Kim et al. |

FOREIGN PATENT DOCUMENTS

| JP | 2001-350442 A | 12/2001 |
| JP | 2002-116500 A | 4/2002 |
| JP | 2006-217208 A | 8/2006 |
| JP | 2010-057149 A | 3/2010 |
| JP | 2010-152173 A | 7/2010 |
| JP | 2011-077825 A | 4/2011 |
| JP | 2013-083872 A | 5/2013 |
| WO | 2018/078813 A1 | 5/2018 |

*Primary Examiner* — Gustavo Polo
(74) *Attorney, Agent, or Firm* — ScienBiziP, P.C.

(57) ABSTRACT

A correction image generating system comprises: a main body of an electronic apparatus, which main body comprises a display portion, a storage portion, a correction data generating portion, and an image data correcting portion; and an imaging portion. The predetermined image data is modified reference image data in which a reference image data is corrected by initial correction data generated in a manufacturing phase of the electronic apparatus; the display portion displays the reference image based on the modified reference image data; and the correction data generating portion generates the correction data based on a comparison result between the imaged image data or data based on the imaged image data, and the modified reference image data or data based on the modified reference image data.

11 Claims, 11 Drawing Sheets

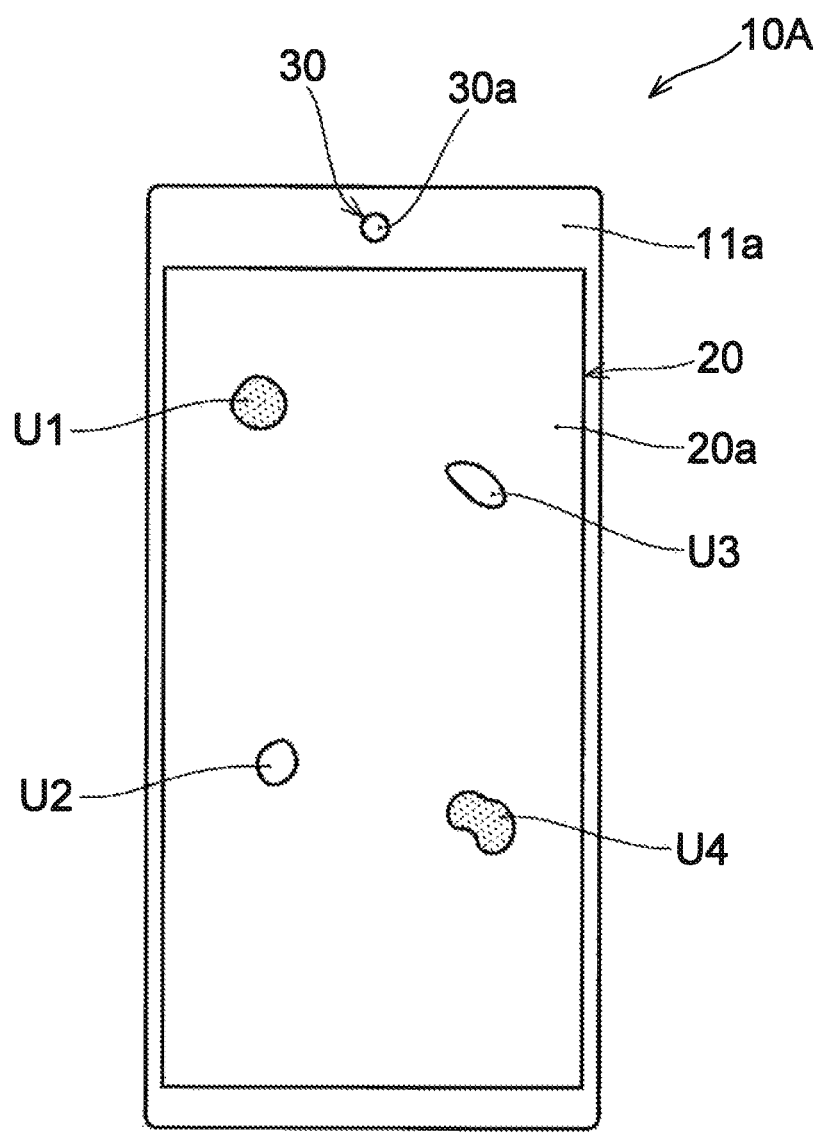

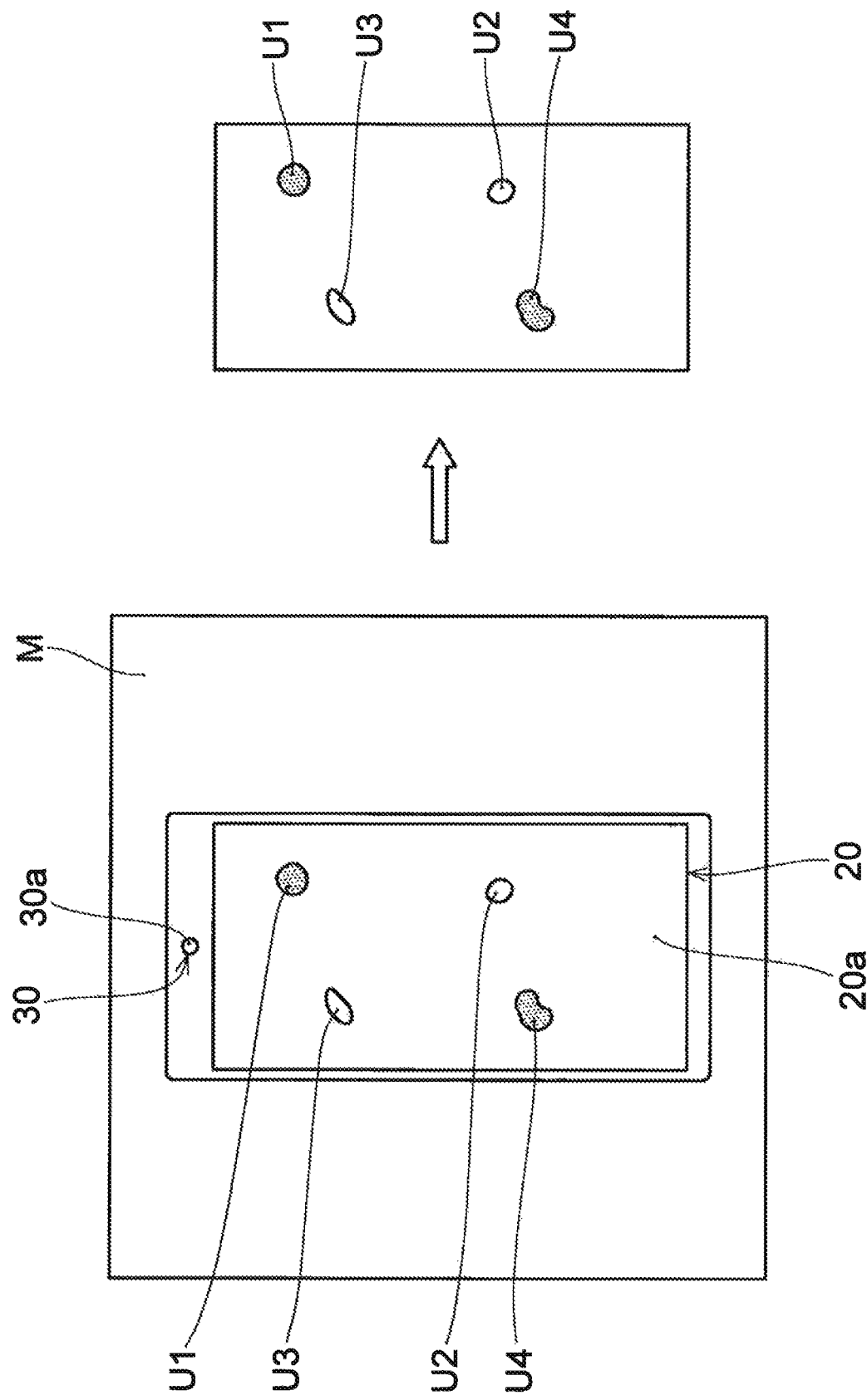

CORRECTION IMAGE GENERATION SYSTEM, IMAGE CONTROL METHOD, IMAGE CONTROL PROGRAM, AND RECORDING MEDIUM

TECHNICAL FIELD

The invention relates to a correction image generating system, an image control method, an image control program, and a storage medium.

BACKGROUND ART

For various uses including a display portion of a television receiver or a mobile apparatus, display apparatuses such as an organic electroluminescent (below-called "organic-EL") display apparatus and a liquid crystal display apparatus are being utilized. In these display apparatuses, a desired color (luminance) to be displayed based on an input signal and a color (luminance) actually displayed can differ due to the effect of the input-output characteristic that a display apparatus has. Therefore, correction such as so-called gamma correction is being carried out in accordance with the characteristic of the above-mentioned display apparatus.

Moreover, in an electronic apparatus comprising a display apparatus, display unevenness (below-called initial display unevenness) caused by manufacturing variations in the phase prior to the user starting use thereof, or, in other words, in the manufacturing phase prior to shipment of the electronic apparatus can be produced. The initial display unevenness is produced by non-uniformity in the characteristic of each of pixels comprised in the display apparatus. The picture quality of the display apparatus is improved by generating, prior to shipping the electronic apparatus, data for correcting image data to make it difficult for the user to visually recognize such initial display unevenness. Specifically, in the final phase of the manufacturing process, the display apparatus is caused to display therein an image based on predetermined image data input externally, and imaged image data of the image being displayed in the display apparatus is obtained using an external imaging apparatus. Then, by comparing the predetermined image data input and the imaged image data, correction data to remove the initial display unevenness is generated. After shipment, an image based on image data corrected using correction data obtained is displayed in the display apparatus (see Patent document 1, for example). As the predetermined image data described above, image data having a certain regularity, including image data in which gradation values are uniform or in which gradation values change continuously, is used. Such a technique makes it difficult to visually recognize the initial display unevenness of the display apparatus, which initial display unevenness is produced in the manufacturing phase, improving the picture quality at the time of use by the user.

PRIOR ART DOCUMENT

Patent Document

Patent Document 1: JP 2010-057149 A

SUMMARY OF THE INVENTION

Problem to be Solved by the Invention

For example, an organic-EL display apparatus displays an image as a collection of light-emitting dots by each organic-EL element being a light-emitting element corresponding to each of pixels emitting light. One of the pixels further comprises sub-pixels such as red, green, and blue, and an organic-EL element emitting red, green, or blue light is formed for each of the sub-pixels. However, caused by manufacturing variations of a thin-film transistor (below called "a TFT") being a drive element to cause an individual organic-EL element to emit light at a desired luminance in addition to manufacturing variations of an organic-EL element individually comprised in each of the sub-pixels, the light-emitting characteristic of each of the sub-pixels can differ. For example, the brightness of the sub-pixel of each color in one region of the organic-EL display apparatus being correspondingly different from the brightness of the sub-pixel in a different region is to cause luminance unevenness to be produced. Moreover, the brightness of the sub-pixel of a certain specific color being different from the brightness of the sub-pixel of a different color causes chromaticity unevenness to be produced. Furthermore, luminance unevenness and chromaticity unevenness can also be produced simultaneously. Such initial display unevenness is often produced primarily as a result of manufacturing variations in the TFT characteristic, of manufacturing variations of the organic-EL element and TFT.

On the other hand, after starting use of the electronic apparatus, the light-emitting characteristic of each of the sub-pixels changes with elapsing of time as a result of an aging degradation of the organic-EL element and the TFT due to the use thereof. In the organic-EL element, the luminance relative to the drive current value generally decreases due to the aging degradation caused by drive current flowing through an organic material making up the organic light-emitting layer and electron/hole injection layer comprised in the deposition structure thereof. The degree of change in the characteristic accompanying such an aging degradation in the organic-EL element is greater than that in the TFT, and the degree of the above-mentioned aging degradation also differs depending on each of the sub-pixels. Therefore, even after starting use of the display apparatus, partial luminance or chromaticity unevenness can be newly produced at different timings and degrees for each organic-EL display apparatus with the progress of the aging degradation. In other words, unlike the initial display unevenness primarily caused by manufacturing variations of the TFT characteristic being produced in the manufacturing phase of the electronic apparatus, display unevenness primarily caused by the aging degradation of the organic-EL display element can be produced after starting use of the electronic apparatus. Therefore, even when an image is displayed in the organic-EL display apparatus based on image data corrected using correction data generated in the final phase of the manufacturing process described above, display unevenness can be produced again in the displayed image due to the degradation of the light-emitting characteristic of organic-EL element and the TFT characteristic with the elapsing of time after starting use of the electronic apparatus. However, an appropriate technique to remove display unevenness due to such an aging degradation has not been proposed yet.

An object of the invention being made to solve such a problem is to provide a correction image generating system, an image control method, an image control program, and a storage medium that make it possible to appropriately remove display unevenness due to the aging degradation produced after starting use of an electronic apparatus.

Means to Solve the Problem

A correction image generating system being one embodiment of the invention comprises: a main body of an electronic apparatus, which main body comprises a display portion, a storage portion having stored therein predetermined image data being reference image data corrected, a correction data generating portion to generate correction data using a reference image to be displayed in the display portion, and an image data correcting portion to correct image data using the correction data; and an imaging portion to obtain imaged image data by imaging the reference image, wherein the predetermined image data is modified reference image data in which the reference image data is corrected by initial correction data generated in a manufacturing phase of the electronic apparatus, the display portion displays the reference image based on the modified reference image data, and the correction data generating portion generates the correction data based on a comparison result between the imaged image data or data based on the imaged image data, and the modified reference image data or data based on the modified reference image data.

An image control method being one embodiment of the invention comprises: a first step of displaying a reference image based on predetermined image data; a second step of obtaining imaged image data by imaging the reference image; a third step of generating correction data using the imaged image data; and a fourth step of correcting image data using the correction data, wherein the predetermined image data is modified reference image data in which reference image data is corrected by initial correction data generated in a manufacturing phase of an electronic apparatus comprising a display portion to display the reference image; and the correction data is generated based on a comparison result between the imaged image data or data based on the imaged image data, and the modified reference image data or data based on the modified reference image data.

An image control program being one embodiment of the invention, in an image control program to cause display unevenness of an image to be corrected in a correction image generating system comprising: a main body of an electronic apparatus, which main body comprises a display portion to display the image based on image data, a storage portion having stored therein predetermined image data being reference image data corrected, a correction data generating portion to generate correction data of the image data, and an image data correcting portion to correct the image data; and an imaging portion to image a subject, the predetermined image data being modified reference image data in which the reference image data is corrected by initial correction data generated in a manufacturing phase of the electronic apparatus, causes the correction image generating system to execute therein a first step of causing the display portion to display a reference image based on the modified reference image data; a second step of causing the imaging portion to obtain imaged image data by causing the imaging portion to image the reference image; a third step of causing the correction data generating portion to generate the correction data based on a comparison result between the imaged image data or data based on the imaged image data, and the modified reference image data or data based on the modified reference image data; and a fourth step of causing the image data correcting portion to correct the image data using the correction data.

A storage medium being one embodiment of the invention is a computer-readable non-transitory storage medium having recorded therein the above-described image control program.

Effects of the Invention

A correction image generating system, an image control method, an image control program, and a storage medium according to one embodiment of the invention make it possible to appropriately remove display unevenness due to the aging degradation produced after starting use of an electronic apparatus.

BRIEF DESCRIPTION OF THE DRAWINGS

FIG. 2 schematically shows a front view of a main body of the correction image generating system in a case of causing a reference image to be displayed in a display portion of the correction image generating system being one apparatus configuration according to the first embodiment of the invention.

FIG. 3 schematically shows a front view of an imaged image displayed in a display portion of the main body of the correction image generating system shown in FIG. 2, which imaged image is reflected on a mirror, and an image in which a display image is trimmed from the imaged image.

EMBODIMENT FOR CARRYING OUT THE INVENTION (Apparatus Configuration According to First Embodiment)

Figure 1A:
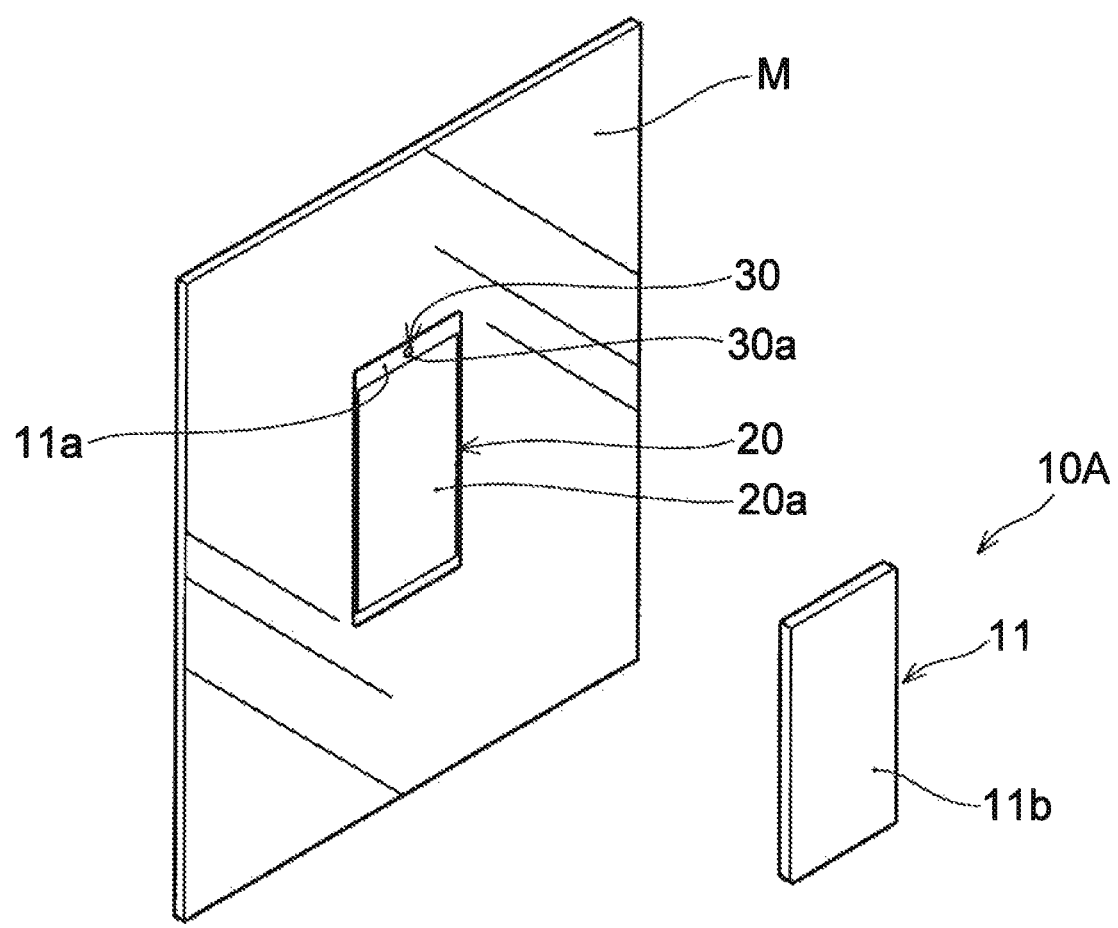
FIG. 1A shows a perspective view of a correction image generating system being one apparatus configuration according to a first embodiment of the invention.
Figure 1B:
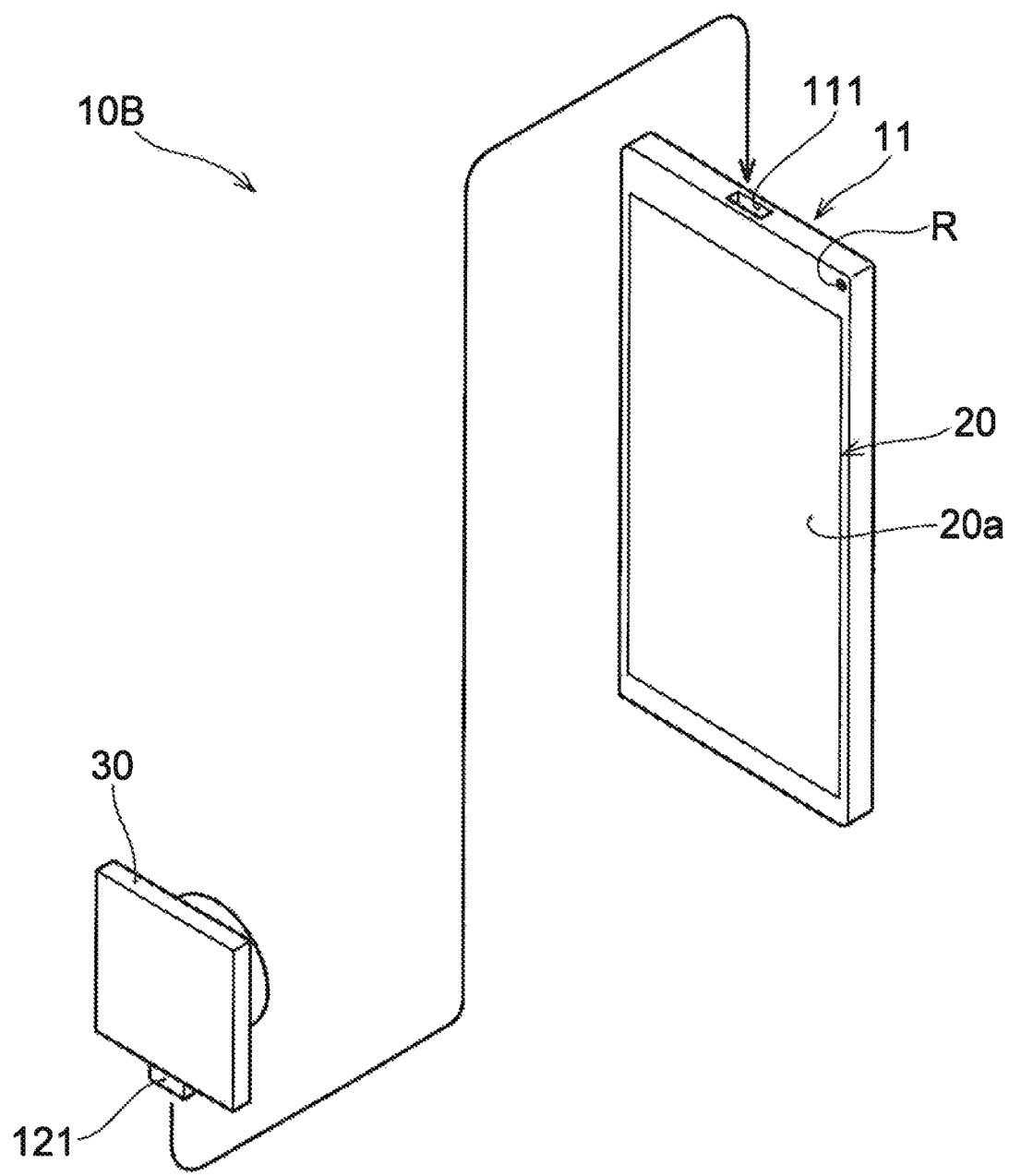
FIG. 1B shows a perspective view of the correction image generating system being one apparatus configuration according to the first embodiment of the invention.
Figure 1C:
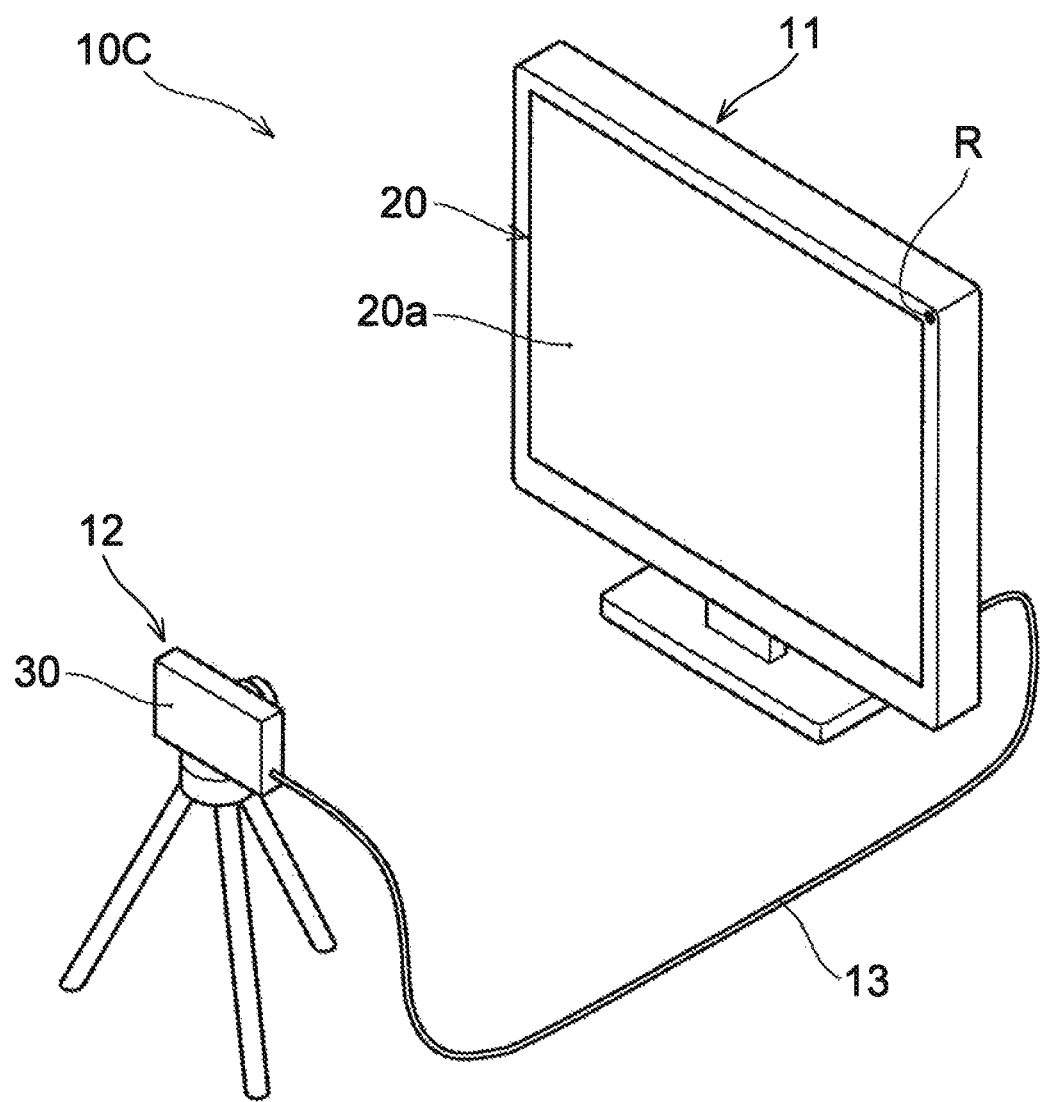
FIG. 1C shows a perspective view of the correction image generating system being one apparatus configuration according to the first embodiment of the invention.

Below, with reference to the drawings, a correction image generating system according to a first embodiment of the invention is explained. FIGS. 1A to 1C show perspective views of an apparatus configuration of the correction image generating system according to the embodiment. In embodiments below including the embodiment, the state in which some unevenness is produced in a display image displayed by a display portion is generally referred to as "display unevenness", so that the "display unevenness" is to include the state of unevenness in the display image, such as chromaticity unevenness and luminance unevenness. Moreover, in each of the drawings, the same letters are given to parts having the same functions.

The apparatus configuration shown in FIG. 1A shows a case in which the correction image generating system is integrated as a mobile apparatus 10A such as a tablet PC (Personal Computer) or a smartphone. The mobile apparatus 10A has embedded, in a main body 11 as one electronic apparatus, various apparatuses to demonstrate various functions as the mobile apparatus 10A and comprises a display portion 20 to display a still image or video and an imaging portion 30 to image a still image or video. (In FIG. 1A, each of the display portion 20 and the imaging portion 30 is reflected on a mirror M.) In other words, in this apparatus configuration, the imaging portion 30 is integrally formed with the main body 11 by being embedded in the main body 11, along with the display portion 20.

The main body 11 of the mobile apparatus is formed in a substantially rectangular parallelepiped shape, for example, and comprises a first surface 11a being one of surfaces configuring the substantially rectangular parallelepiped shape (In FIG. 1A, the first surface 11a is reflected on the mirror M.) and a second surface 11b being a surface opposite to the first surface 11a. Then, the display portion 20 and the imaging portion 30 are mounted to the main body 11 such that a display surface 20a of the display portion 20 and an imaging window 30a of the imaging portion 30 are exposed in a direction of the first surface 11a. Here, in the apparatus configuration shown in FIG. 1A, the imaging portion 30 can be formed so as to project from the main body 11 all the time, or can be formed to freely enter into/exit from the main body 11 so as to project from the main body 11 only at the time of use (in other words, so as to attach a drive mechanism such as a motor or a spring to the imaging portion 30 or the main body 11 so as to project from the main body 11 only at the time needed). In other words, as long as the display surface 20a of the display portion 20 and the imaging window 30a of the imaging portion 30 are mounted such that they are exposed in a direction of the first surface 11a, the display portion 20 and the imaging portion 30 can be either one of being mounted to the first surface 11a of the main body 11 and being projected from the main body 11. In such a configuration of the mobile apparatus 10A, the imaging window 30a of the imaging portion 30 is oriented in the same direction as the display surface 20a of the display portion 20, so that the imaging portion 30 can image a display image of the display portion 20 by causing the display portion 20 of the mobile apparatus 10A to be reflected on the mirror M.

The apparatus configuration shown in FIG. 1B shows a case in which the correction image generating system is a mobile apparatus 10B comprising the imaging portion 30 being free to be attached to/detached from the main body 11 of the electronic apparatus. Specifically, for example, the main body 11 comprising a female electrical connector 111 and the imaging portion 30 comprising a corresponding male electrical connector 121 allow the imaging portion 30 to communicate with the main body 11 via wired communication by means of mechanical coupling of the female/male electrical connectors 111, 121. The imaging portion 30 can be communicatively connected to the main body 11 also via wireless communication such as Bluetooth (Registered trademark) or Wi-Fi (Registered trademark). Moreover, the imaging portion 30 can be communicatively connected to the main body 11 via both wired communication by means of mechanical coupling such as mating, and wireless communication. Female/male of the electrical connectors 111, 121 can be reversed, and the imaging portion 30 can be a dedicated component of the main body 11 or can be a component shared with a different system. In other words, in this apparatus configuration, the imaging portion 30 comprises an attachment/detachment mechanism to carry out attachment to the main body 11 and releasing of the attachment.

The apparatus configuration shown in FIG. 1C shows a case in which the correction image generating system is a system 10C comprising two apparatuses comprising the main body 11 of the electronic apparatus as a display apparatus and the imaging portion 30 being a separate apparatus 12 as an imaging apparatus, for example. While the imaging portion 30 is communicatively connected to the main body 11 via wired such as a cable line 13 in the example shown in FIG. 1C, it can be communicatively connected to the main body 11 via wireless. In other words, in this apparatus configuration, the imaging portion 30 is formed as the separate apparatus 12 from the main body 11, and the imaging portion 30 is connected to the main body 11 via wired or wireless.

In such an embodiment described above, an outline procedure to remove display unevenness comprised in a display image to be displayed in the display portion 20 is explained with reference to FIGS. 1A, 2, and 3 with the apparatus configuration of the mobile apparatus 10A shown in FIG. 1A as an example. FIG. 2 shows a first surface 11a of the mobile apparatus 10A with time having elapsed after starting use of the electronic apparatus, showing the state when causing a reference image to be displayed in the display portion 20 based on modified reference image data. Here, "reference image" is to refer to an image used to visually recognize display unevenness comprised in a display image, and "reference image data" is to refer to image data to be the basis for displaying the reference image. Moreover, "initial correction data" is to refer to data to correct image data to remove initial display unevenness produced in the manufacturing phase of an electronic apparatus, and "modified reference image data" is to refer to data in which reference image data is corrected by initial correction data. "Manufacturing phase" is to refer to any phase in the manufacturing process up to when an electronic apparatus comprising the display portion 20 is shipped and is to comprise not only the manufacturing process of the main body 11, but also the manufacturing process of the display portion 20 and the manufacturing process of constituting elements such as the display portion 20, up to the completion of the electronic apparatus.

For example, in a case that reference image data is grayscale image data having a single gradation value, when a reference image is displayed in the display portion 20 based on the modified reference image data, initial display unevenness produced primarily as a result of manufacturing variations of the characteristic of a switching element such as a TFT making up a sub-pixel is removed, so that a gray image having a contrast being uniform across the entire display surface 20a should be displayed as a display image in the display portion 20. However, as the aging degradation of the characteristic after starting use of the electronic apparatus is not uniform for each element making up the pixel of the display portion 20, for example, portions displayed brightly (below-called "bright portions of display unevenness" U2, U3) and portions displayed darkly (below-called "dark portions of display unevenness" U1, U4) are produced in the display image. These bright portions U2, U3 and dark portions U1, U4 of display unevenness reflect only display unevenness produced after starting use of the electronic apparatus and are produced primarily as a result of variations in the aging degradation of the characteristic of a pixel element such as an organic-EL element making up each sub-pixel. In a case that the user visually recognizes portions of display unevenness U1 to U4, a touch operation of the display portion 20, for example, causes execution of an image control program described below to be started. Then, as shown in FIG. 1A, after a display image is caused to be reflected on the mirror M, as shown in FIG. 3, the user obtains imaged image data by imaging the display image of the display portion 20 using the imaging portion 30. At this time, the image to be reflected on the mirror M is a mirror image of the display image. Thereafter, the image control program stored in the main body 11, as described below, carries out image processing to trim only a portion corresponding to the display image from the imaged image data and causes the mobile apparatus 10A to execute generation of correction data to remove the portions of display unevenness U1 to U4 after starting use of the electronic apparatus by comparing, with the modified reference image data, the imaged image data obtained after trimming. Then, correcting arbitrary image data to be displayed in the display portion 20 based on the correction data obtained causes a display image in which the portions of display unevenness U1 to U4 are removed to be displayed in the display portion 20 of the mobile apparatus 10A. In this way, imaging a mirror image of a display image using the mirror M makes it possible to obtain imaged image data without separately providing an imaging apparatus being separate from the main body 11 even in a case of the mobile apparatus 10A in which the imaging portion 30 is integral with the main body 11 of an electronic apparatus.

As the imaging portion 30 can be made to directly oppose the display portion 20 in the apparatus configuration of the mobile apparatus 10B shown in FIG. 1B and the apparatus configuration of the mobile apparatus 10C shown in FIG. 1C, it is not necessarily required to cause the display image to be reflected on the mirror M as in the mobile apparatus 10A shown in FIG. 1A, so that the display image can be directly imaged by the imaging portion 30.

In other words, as described below, in each of the apparatus configurations according to the embodiment, various functions to correct arbitrary image data in accordance with the degree of the aging degradation of the display portion 20 after starting use of the electronic apparatus are provided in the main body 11 of the mobile apparatus 10A, 10B, or the system 10C. Therefore, the user does not have to replace the display portion 20 with a new one in a case that display unevenness due to the aging degradation is produced after starting use of the electronic apparatus, making it possible to appropriately remove display unevenness of the display portion 20 at the intended timing by the user himself with a simple technique without taking the time to bring the apparatus into a repair shop or call up a repair operator for replacement.

(Block Configuration of First Embodiment)

Figure 4:
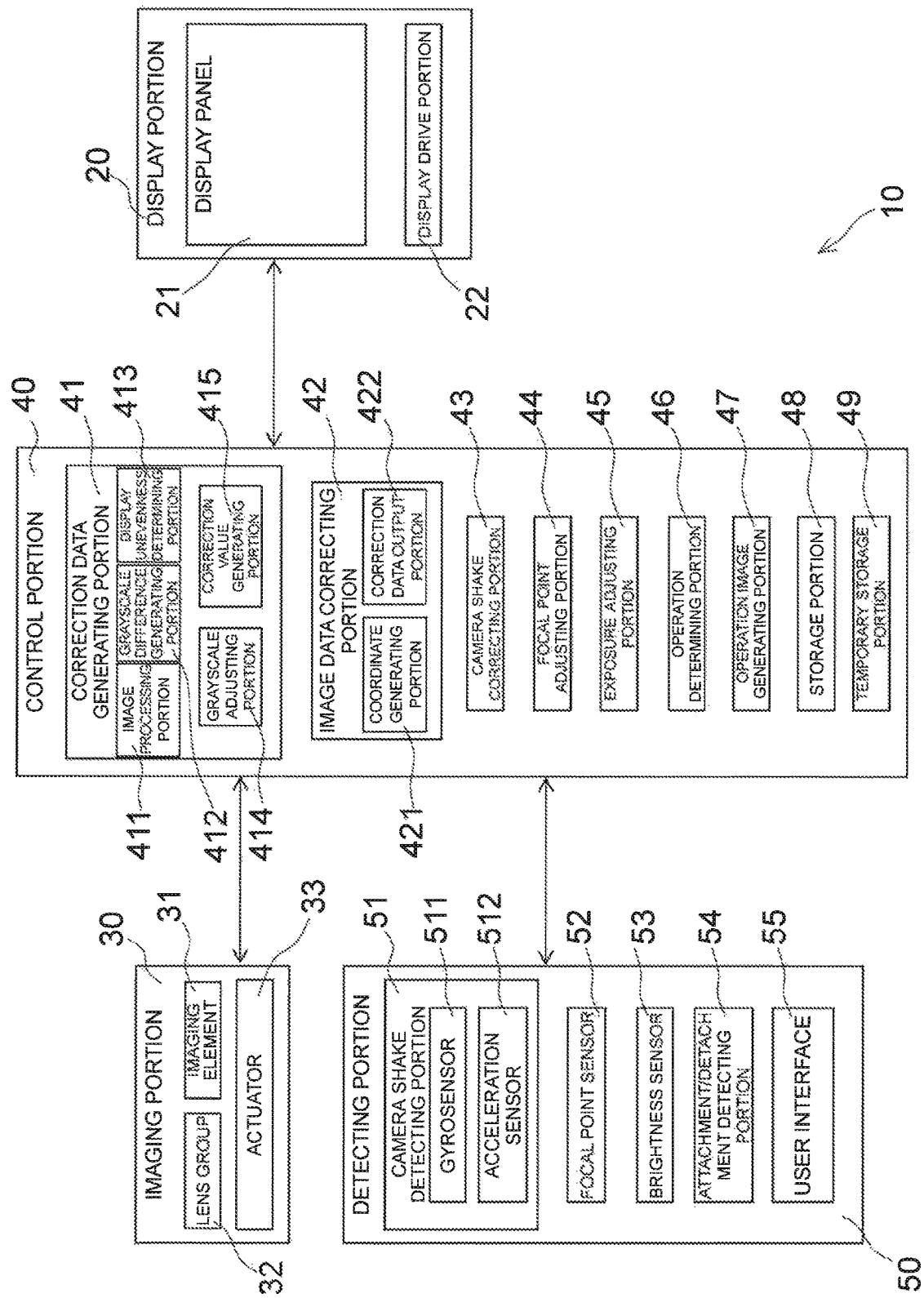
FIG. 4 shows a block diagram of the overview of the configuration of the correction image generating system according to the first embodiment of the invention.

Next, an overview of the block configuration of the correction image generating system of the above-described apparatus configuration will be described. FIG. 4 shows, in a block diagram, the overview of the configuration of the correction image generating system according to the first embodiment of the invention. The mobile apparatus 10A in FIG. 1A, the mobile apparatus 10B in FIG. 1B, and the system 10C in FIG. 1C are shown as the correction image generating system 10 in FIG. 4.

As shown in FIG. 4, the correction image generating system 10 according to the embodiment comprises the display portion 20, the imaging portion 30, a control portion 40, and a detecting portion 50.

The display portion 20 is a portion to display an image based on image data and comprises, for example, a display panel 21 configured with an active matrix-type organic-EL display panel or a liquid crystal display panel, and a display drive portion 22 to drive the display panel.

Figure 5:
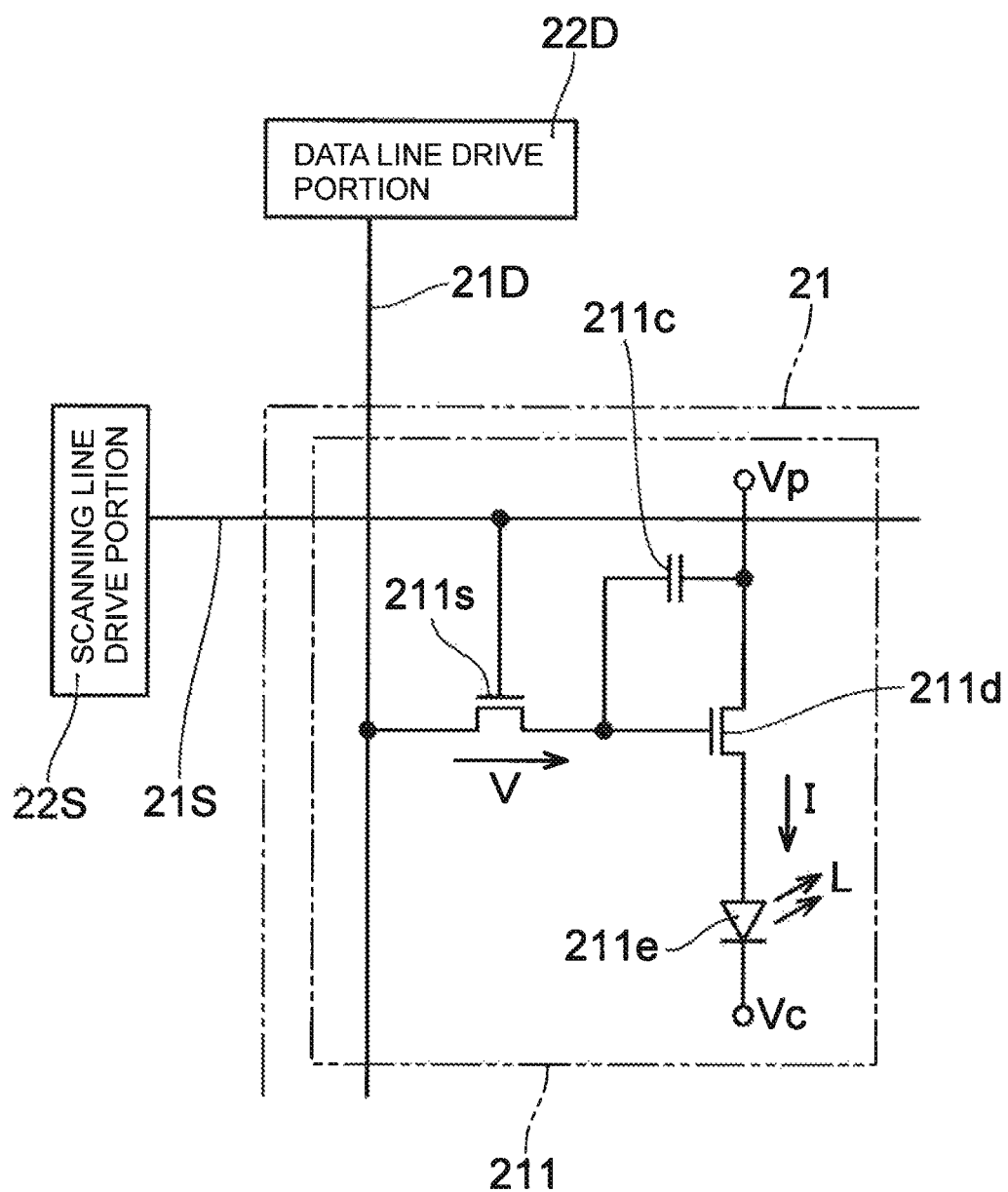
FIG. 5 shows a circuit diagram of the overview of the configuration of the display portion comprised in the correction image generating system according to the first embodiment of the invention.

As shown in FIG. 5, the display panel 21 comprises pixels configuring the display image, and one of the pixels comprises a plurality of sub-pixels 211 configured with a R (red) sub-pixel, a G (green) sub-pixel, and a B (blue) sub-pixel, emitting red-colored light, green-colored light, and blue-colored light, respectively (In FIG. 5, only one of the sub-pixels 211 is shown for brevity of explanations). Then, in a case that the display panel 21 is an organic-EL display panel, for example, each of the sub-pixels 211 comprises a pixel element 211e configured with an organic-EL element to adjust the light-emitting intensity of the red-colored light, the green-colored light, or the blue-colored light; a drive switching element 211d configured with a TFT to supply electric power to the pixel element 211e; a selection switching element 211s configured with a TFT to select the sub-pixels 211; a capacitive element 211c configured with a capacitor to store electric charges; and a data line 21D and a scanning line 21S to which a data signal and a scanning signal are input, respectively.

Moreover, a display drive portion 22 comprises a data line drive portion 22D to generate a data signal to supply it to the data line 21D and a scanning line drive portion 22S to generate a scanning signal to supply it to the scanning line 21S.

Specifically, the scanning line 21S is connected to the gate electrode of the selection switching element 211s, and, in a case that a high-level scanning signal is input to the scanning line 21S, the selection switching element 211s is turned ON. On the other hand, the data line 21D is connected to one of the source electrode and the drain electrode of the selection switching element 211s, and, in a case that the selection switching element 211s is turned ON, a data voltage V according to a data signal is input to the gate electrode of the drive switching element 211d being connected to the other one of the source electrode and the drain electrode of the selection switching element 211s. The data voltage V is held for a predetermined time period by the capacitive element 211c connected between the gate electrode and the source electrode or the drain electrode of the drive switching element 211d.

Figure 6:
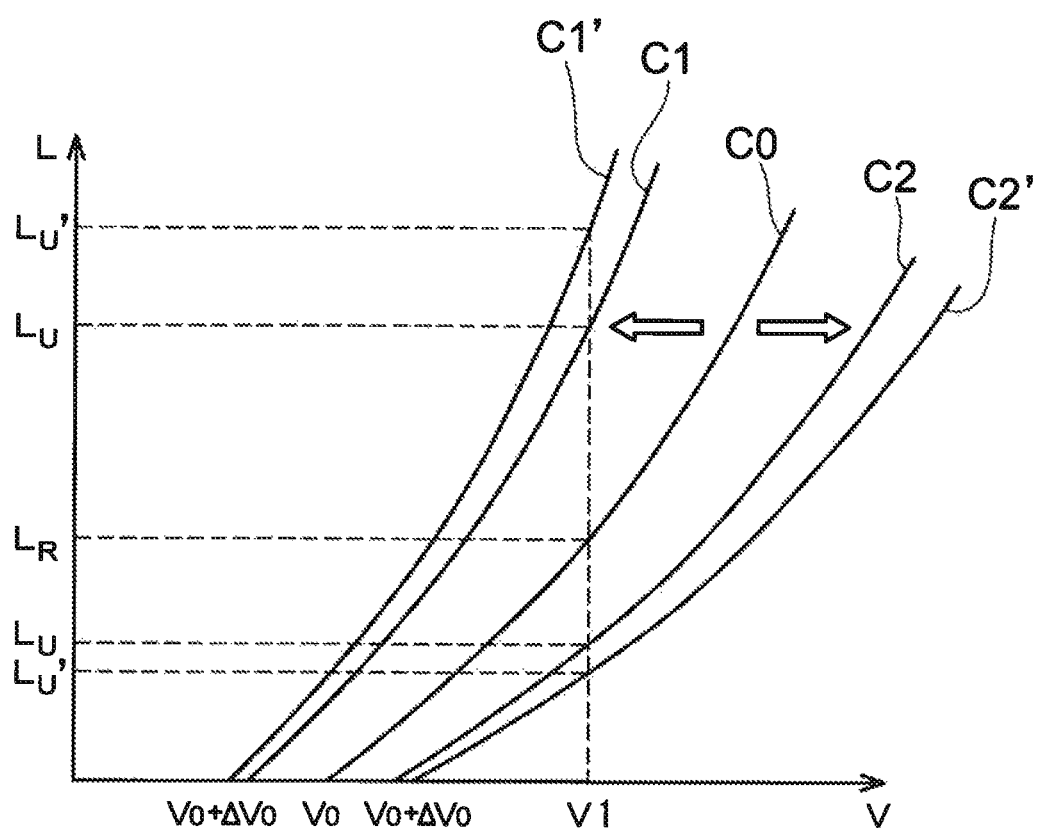
FIG. 6 shows a graph of the overview of the voltage-luminance characteristic of a circuit shown in FIG. 5.

One of the drain electrode and the source electrode of the drive switching element 211d is connected to a power supply electrode Vp, while the other thereof is connected to the anode electrode of the pixel element 211e. The cathode electrode of the pixel element 211e is connected to a common electrode Vc. Then, in a case that the drive switching element 211d is turned ON in the above-described predetermined time period, an element current value I flowing through the pixel element 211e in accordance with the data voltage value V causes red-colored light, green-colored light, or blue-colored light to be emitted with a luminance L in accordance with the data voltage value V with the characteristic as shown in FIG. 6. The relationship between the data voltage value V and the luminance L will be described below.

In this way, the pixel element 211e of each of the sub-pixels 211 comprised in a large number of pixels configuring the display panel 21 is controlled by the data signal and the scanning signal, allowing the display portion 20 to display an image on the display surface 20a based on arbitrary image data. Then, the correction image generating system 10 according to the embodiment generates below-described correction data to primarily complement the aging degradation of the light-emitting characteristic of the pixel element 211e. At the same time therewith, the aging degradation of the switching element characteristic of the selection switching element 211s and the drive switching element 211d is also complemented by this correction data.

Returning to FIG. 4, the imaging portion 30 is a portion to image a subject and comprises an imaging element 31 to obtain light from a subject as imaged image data, which light is incident from the imaging window 30a shown in FIG. 1A; a lens group 32 to form, on an imaging surface of the imaging element 31, an image of the subject; and an actuator 33 to displace at least one of the imaging element 31 and the lens group 32.

The imaging element 31 is configured with a CCD (Charge-Coupled Device) image sensor or a CMOS (Complementary Metal Oxide Semiconductor) image sensor. The imaging element 31 can adjust the imaging sensitivity thereof based on a brightness adjusting signal described below.

The lens group 32 comprises a focus lens to focus on the subject; a correction lens to correct an optical path such that the formed image of the subject falls within the imaging surface of the imaging element 31; and a diaphragm mechanism and a shutter mechanism to adjust an exposure amount of the imaging element 31 by changing the size of a diaphragm, and the shutter speed. In the specification, the expression "focus on a subject" and expression similar thereto are to refer to the state in which the offset between the image-forming surface of the subject and the imaging surface of the imaging element falls within the allowable range (focal depth), so that the focus is apparently on the subject.

The actuator 33 is formed of a voice coil motor, a piezoelectric element, or a shape memory alloy and is coupled with the imaging element 31, or a correcting lens of the lens group 32. The actuator 33 causing the imaging element 31, or the correcting lens of the lens group 32 to be relatively displaced with respect to the imaging portion 30 in the direction to cancel out a shake of the imaging portion 30 based on a camera shake correcting signal described below causes detrimental effect on imaged image data due to a so-called camera shake to be suppressed. Instead of this configuration, the imaging element 31 and the lens group 32 can be configured as one unit, and this unit can be made to couple with the actuator 33. In this case, the actuator 33 causing the imaging element 31 and lens group 32 being integral to be relatively displaced with respect to the imaging portion 30 allows detrimental effect on the imaged image data due to camera shake to be suppressed.

Moreover, the actuator 33 is coupled to the focus lens of the lens group 32. This causes the actuator 33 to displace the focus lens based on a focal point adjusting signal described below, so that the imaging portion 30 can automatically focus on the subject. Furthermore, the actuator 33 is coupled with the diaphragm mechanism and shutter mechanism of the lens group 32, and the brightness adjusting signal described below being input allows the imaging portion 30 to adjust the size of the diaphragm, and the shutter speed, respectively. Moreover, the actuator 33 can also displace the focus lens so as to automatically track the subject to continue focusing thereon even when the subject moves in a case that the subject is focused on once.

The control portion 40 is a portion to carry out control of each portion configuring the correction image generating system 10 and arithmetic operation on data, which portion comprises a CPU (Central Processing Unit); a RAM (Random Access Memory) such as a DRAM (Dynamic Random Access Memory) or an SRAM (Static Random Access Memory); a ROM such as a flash memory or an EEPROM (Electrically Erasable Programmable Read-Only Memory); and a peripheral circuit therefor. The control portion 40 can execute a control program being stored in the ROM to function as a storage portion 48 described below and, at that time, uses, as a work area, the RAM to function as a temporary storage portion 49 described below. By executing an image control program being stored in the ROM, the control portion 40 functions as a correction data generating portion 41; an image data correcting portion 42; a camera shake correcting portion 43; a focal point adjusting portion 44; an exposure adjusting portion 45; an operation determining portion 46; an operation image generating portion 47; the storage portion 48; and the temporary storage portion 49.

The correction data generating portion 41 is a portion to generate correction data to correct image data to remove display unevenness of a display image to be displayed in the display portion 20 and comprises an image processing portion 411; a gradation difference generating portion 412; a display unevenness determining portion 413; a gradation adjusting portion 414; and a correction value generating portion 415. Specifically, the correction data generating portion 41 generates correction data using a comparison result between display image data of an image displayed in the display portion 20 or data based on the display image data and modified reference image data or data based on the modified reference image data. Here, "data based on display image data" comprises data with the display image data being inverted and data in which gradation values of the image data are adjusted, while "data based on modified reference image data" comprises data with the modified reference image data being inverted. Moreover, "inverting image data" refers to subjecting image data to a so-called "left-right inversion" in which, in between two coordinates being symmetrical with the center column as a symmetrical axis in each row of coordinates of the image data, a gradation value of each thereof is exchanged. Furthermore, "adjusting a gradation value" refers to uniformly changing gradation values of all of coordinates of corresponding image data such that bright/dark contrast of the display image is changed.

Here, according to the embodiment, as the display image data, the imaged image data obtained by the imaging portion 30 imaging is used. In other words, in the embodiment, display image data of a display image displayed in the display portion 20 is obtained as the imaged image data. Moreover, as described below, the correction data generating portion 41 can also be used at the time of generating initial correction data, not only correction data to correct display unevenness produced after starting use of an electronic apparatus such as a display apparatus of the mobile apparatus 10A, 10B, or the system 10C comprising the display portion 20. The correction data is generated in correspondence with each of the coordinates of the image data (addresses corresponding to one pixel of the display panel 21). Here, "coordinates" are to comprise, not only one coordinate in image data corresponding to one pixel or one sub-pixel, but the coordinate group within image data corresponding to a display area into which the display surface 20a is equally divided. In other words, the correction data generating portion 41 can calculate correction data for each coordinate group corresponding to a display area, not for each coordinate in image data corresponding to one pixel or one sub-pixel.

The image processing portion 411 carries out image processing to trim only a portion corresponding to a display image from imaged image data to produce imaged image data to be used at the time of generating correction data. Moreover, in a case of the apparatus configuration in which the image portion 30 is free to be attached to/detached from the main body 11 as shown in FIG. 1B, it is preferable to determine the state of attachment to/detachment from the main body 11 of the imaging portion 30 by the below-described attachment/detachment detecting signal being input thereto. Furthermore, in a case that the imaging portion 30 is determined to be removed from the main body 11 in the apparatus configuration as the mobile apparatus 10B, or, in a case of the apparatus configuration as the system 10C as shown in FIG. 1C, the imaging processing portion 411 preferably determines whether a reference image imaged by the imaging portion 30 is a mirror image reflected on the mirror M. As described below, the image processing portion 411 can execute this determination based on a recognition mark R comprised in the imaged image data or data based on the imaged image data, for example.

In a case that the reference image is imaged in the state of being a mirror image, the imaged image data obtained cannot be simply compared with the modified reference image data. Therefore, in a case that the reference image is determined to be a mirror image, the image processing portion 411 preferably carries out image processing to invert either one of the imaged image data and the modified reference image data to simplify the comparison between the imaged image data and the modified reference image data. In this case, the correction data generating portion 41 preferably generates correction data based on a comparison result between the imaged image data being inverted and the reference image data or a comparison result between the imaged image data and the modified reference image data being inverted.

The reference image to be displayed in the display portion 20 using the modified reference image data is displayed in the state in which the initial display unevenness produced in the manufacturing phase of the electronic apparatus is removed, so that display unevenness produced in this reference image can be said to be produced after starting use of the electronic apparatus. In this case, there is an advantage that display unevenness can be removed by causing the below-described image control program to be executed at the time the user can visually recognize display unevenness after starting use thereof.

In a case of the apparatus configurations as shown in FIGS. 1B and 1C, as described below, the image processing portion 411 determines the orientation of the imaged image and, in a case that an orientation of the reference image imaged by the imaging portion 30 is different from an orientation of the reference image displayed by the display portion 20, an image processing to match the orientation of the imaged image data to the orientation of the modified reference image data is preferably carried out.

The gradation difference generating portion 412 generates gradation difference data being the difference between the imaged image data or modified imaged image data generated by the below-described gradation adjusting portion 414 and the modified reference image data. Here, in the reference image displayed in the display portion 20 based on the modified reference image data, only display unevenness after starting use of the electronic apparatus is reflected, and, in the modified reference image data, correction to remove initial display unevenness produced in the manufacturing phase of the electronic apparatus is reflected, so that gradation difference data of the coordinates corresponding to the initial display unevenness and the display unevenness after starting use is to take a value other than "0". Moreover, similarly in the manufacturing phase of the electronic apparatus such as the mobile apparatus 10A, 10B, or display apparatus 10C as well, the gradation difference generating portion 412 can generate initial gradation difference data being the difference between the imaged image data or modified imaged image data and the reference image data.

The display unevenness determining portion 413 determines the brightness/darkness of the initial display unevenness and the display unevenness after starting use based on the gradation difference data input from the gradation difference generating portion 412. Specifically, for example, the display unevenness determining portion 413 determines, in the gradation difference data, the coordinates being "0" as not having display unevenness, the coordinates having a positive value as a bright portion of luminance unevenness, and the coordinates having a negative value as a dark portion of luminance unevenness.

In a case that the gradation value of the imaged image data (the overall luminance in the reference image) does not sufficiently match the gradation value of the modified reference image data to be compared with even by an adjustment by a below-described exposure adjusting portion 45, the gradation adjusting portion 414 generates modified imaged image data in which a gradation value of the imaged image data is adjusted. Specifically, by multiplying the gradation value of the imaged image data by a certain value at each of the coordinates, the gradation adjusting portion 414 calculates a multiplier value in which the gradation value of the multiplied imaged image data best matches the gradation value of the modified reference image data, and generates modified imaged image data multiplying the gradation value of each of the coordinates of the imaged image data using the calculated multiplier value. In a case that the gradation value of the imaged image data is generated such that it best matches the gradation value of the modified reference image data by adjustment by the exposure adjusting portion 45, the gradation adjusting portion 414 does not have to modify the imaged image data. While the gradation adjusting portion 414 can generate the modified reference image data in the same manner also in the manufacturing phase of the electronic apparatus, in that case, data to be compared with the imaged image data is reference image data.

Based on the imaged image data or the modified imaged image data, the correction value generating portion 415 generates correction parameters for each coordinate as a correction value table from the relationship between the gradation value of the image data and the data voltage value V input to the pixel element 211e of the sub-pixel 211. Moreover, based on the determination results of either one of brightness and darkness of display unevenness by gradation difference data input from the display unevenness determining portion 413, the correction value generating portion 415 can generate correction data such that the gradation value of the coordinates applicable to a specific combination is corrected and the gradation value of the coordinates not applicable to the specific combination is maintained. Specifically, as in the below-described image processing method embodiment, the correction data can be generated by maintaining the gradation value of the coordinates being a dark portion of display unevenness and a dark portion of initial display unevenness as well and adjusting the gradation value of the coordinates being the other display unevenness, for example. Furthermore, similarly in the manufacturing phase of the electronic apparatus as well, the correction value generating portion 415 can generate initial correction parameters for each of the coordinates as an initial correction value table based on the imaged image data or the modified imaged image data. Correction parameters to remove only the initial display unevenness is to be stored in this initial correction value table. The gradation difference data and correction value table described above are comprised in the correction data, while the initial gradation difference data and initial correction value table described above are comprised in the initial correction data.

Here, according to the embodiment, correction data is generated based on the comparison result between imaged image data in which only initial display unevenness produced in the manufacturing phase of the electronic apparatus and display unevenness after starting use are reflected, modified imaged image data, or data in which image data being either one of these is inverted, and modified reference image data or data in which this is inverted, so that the correction data generating portion 41 is to generate, as a correction value table, correction parameters for each of the coordinates to remove initial display unevenness, and display unevenness after starting use.

The image data correcting portion 42 is a portion to correct arbitrary image data using correction data generated by the correction data generating portion 41 and comprises a coordinate generating portion 421; a correction data output portion 422; a multiplier 423; and an adder 424.

Figure 7:
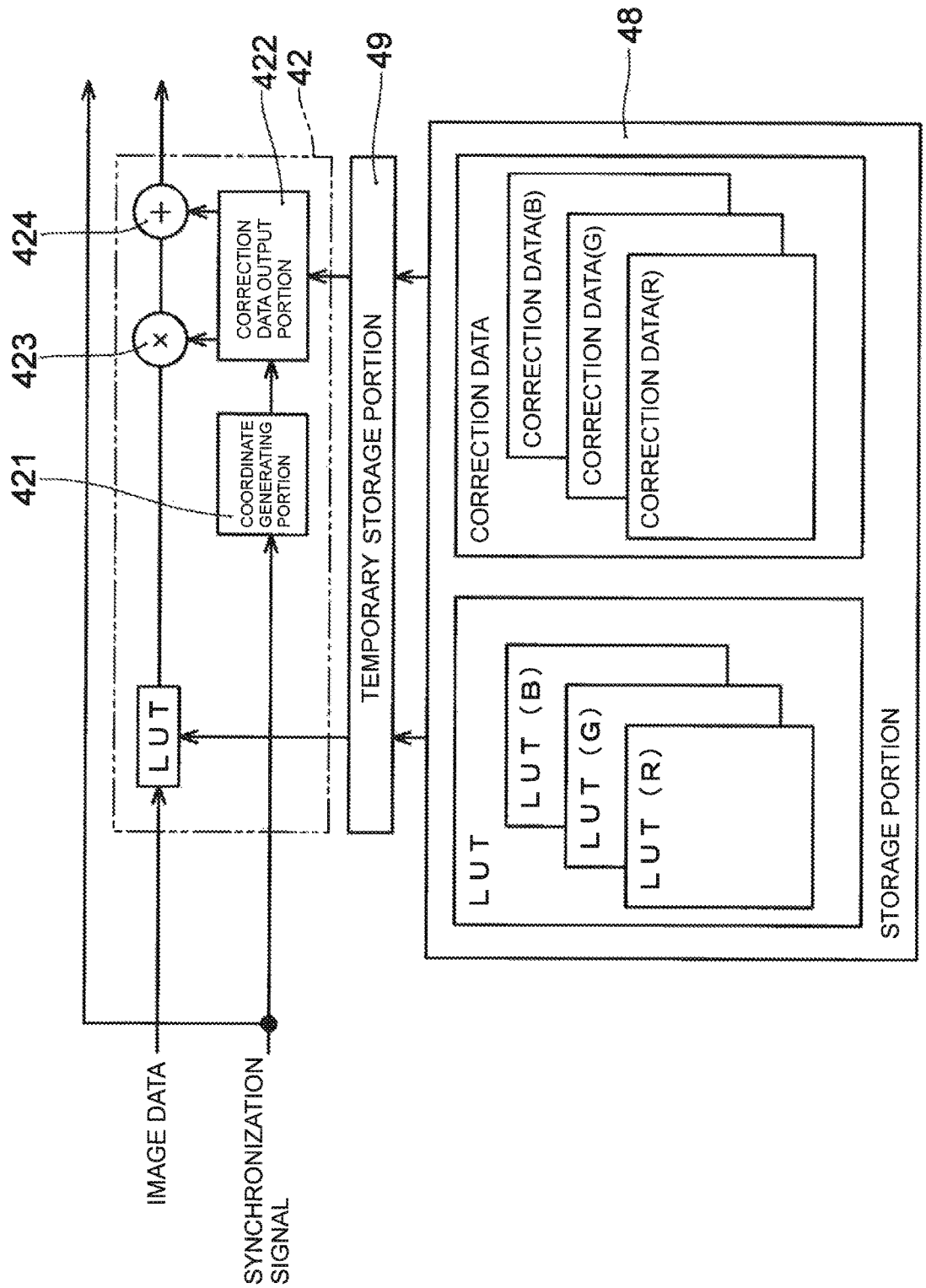
FIG. 7 shows a block diagram of the overview of a method for correcting image data in an image control method being the first embodiment of the invention.

As shown in FIG. 7, the coordinate generating portion 421 generates, based on a synchronization signal synchronized with image data, a coordinate signal corresponding to the coordinates in the image data and inputs the generated coordinate signal to the correction data output portion 422.

The correction data output portion 422 outputs correction parameters according to the coordinate signal to the multiplier 423 and the adder 424. Specifically, the correction data output portion 422 stores these in the temporary storage portion 49 by reading from a correction value table stored in the storage portion 48, and, then, outputs, to the multiplier 423 and the adder 424, correction parameters for the coordinates corresponding to the coordinates of the coordinate signal input from the coordinate generating portion 421. In other words, the correction data output portion 422 corrects, by the correction parameters, the initial display unevenness produced in the manufacturing phase of the electronic apparatus and the display unevenness produced after starting use of the electronic apparatus. During the time period from the time of starting use of the electronic apparatus to the time at which correction data is generated, the correction data output portion 422 can output them to the multiplier 423 and the adder 424.

Returning to FIG. 4, based on a camera shake detecting signal generated by a below-described camera shake detecting portion 51, the camera shake correcting portion 43 generates a camera shake correcting signal to displace the imaging element 31, or a correction lens of the lens group 32. In a case that, with the imaging element 31 and the lens group 32 as one unit, this unit is integrally displaced as described above, the camera shake correcting portion 43 generates a camera shake correcting signal to displace the unit.

The camera shake correcting portion 43 can comprise a function to carry out image processing of imaged data so as to cancel out a shake of the imaging portion 30 by causing the imaging portion 30 to shorten the exposure time than usual to cause it to obtain a plurality of image data sets imaged and align them to be superimposed. In this case, to electronically correct a camera shake of imaged image data, the camera shake detecting portion 51 does not have to be provided, and the camera shake correcting portion 43 generates imaged image data without any detrimental effect due to the camera shake, instead of generating a camera shake correcting signal. Moreover, the camera shake correcting portion 43 can estimate the blurring function (PSF: Point Spread Function) from the imaged image data obtained by the imaging portion 30 and restore an image using a Wiener filter to generate imaged image data without any detrimental effect due to the camera shake. In this case as well, for the same reason as the above-described reason, the camera shake detecting portion 51 does not have to be provided, and the camera shake correcting portion 43 generates imaged image data without any detrimental effect due to the camera shake, instead of generating the camera shake correcting signal.

By displacing the focus lens of the lens group 32 based on a focal point offset detecting signal generated by a focal point sensor 52, the focal point adjusting portion 44 generates a focal point adjusting signal to focus on the subject.

Based on a brightness detecting signal generated by a brightness sensor 53, the exposure adjusting portion 45 generates a brightness adjusting signal to adjust at least one of the imaging sensitivity of the imaging element 31, and the diaphragm mechanism and the shutter mechanism of the lens group 32. Moreover, the exposure adjusting portion 45 generates a brightness determining signal to show whether the brightness surrounding the correction image generating system 10 is less than or equal to a predetermined value based on the brightness detecting signal.

Based on an operation signal generated by a user interface 55, the operation determining portion 46 generates a control signal to cause each portion of the correction image generating system 10 to execute the following step in a program.

The operation image generating portion 47 selects, from a plurality of operation image data sets stored in the storage portion 48, a specific operation image data set to display an operation image at the time the user operates a touch panel based on the brightness determining signal generated by the exposure adjusting portion 45 and superimposes, on image data, the selected operation image data.

The storage portion 48 is a portion to store various data sets, is configured with a rewritable non-volatile storage medium, and stores the modified reference image data, the reference image data, the initial correction data, data on various characteristics in the manufacturing phase of the correction image generating system 10, and the operation image data. Moreover, the storage portion 48 can store correction data generated by the correction data generating portion 41. Furthermore, the storage portion 48 can store data in which the modified reference image data is corrected by the correction data.

The temporary storage portion 49 is a portion to temporarily store data by reading data such as correction data stored in the storage portion 48 during an operation of the electronic apparatus and is configured with a volatile storage medium whose read speed at which stored data is read is greater than that in the storage portion 48. By reading the correction data from the storage portion 48 during an operation of the electronic apparatus, the temporary storage portion 49 can temporarily store the correction data.

The detecting portion 50 is a portion to detect, as a detecting signal, a physical quantity inner or outer to the correction image generating system 10 and comprises the camera shake detecting portion 51; the focal point sensor 52; the brightness sensor 53; an attachment/detachment detecting portion 54; and the user interface 55.

The camera shake detecting portion 51 comprises a gyrosensor 511 and an acceleration sensor 512 detecting the angular velocity and the acceleration produced by a shake of the imaging portion 30 as an angular velocity sensing signal and an acceleration sensing signal, respectively, and detects the shake of the imaging portion 30 as a camera shake detecting signal comprising the angular velocity sensing signal and the acceleration sensing signal.

The focal point sensor 52 comprises a phase difference sensor, a contrast sensor, or both thereof, for example, and detects an offset in focus of the subject in the imaging element 31 of the imaging portion 30 as a focal point offset detecting signal.

The brightness sensor 53 is configured with a phototransistor or a photodiode, for example, and detects the brightness in the surrounding of the correction image generating system 10 as a brightness detecting signal.

In a case that the correction image generating system 10 is a mobile apparatus 10B comprising the imaging portion 30 being free to be removed from the main body 11 as shown in FIG. 1B, the attachment/detachment detecting portion 54 detects a state of the attachment/detachment state between the imaging portion 30 and the main body 11 as an attachment/detachment detecting signal.

Specifically, the attachment/detachment detecting portion 54 detects whether the imaging portion 30 is attached to the main body 11 in accordance with the conduction state between a pair of terminals for mating detection, which pair of terminals is provided in the electrical connectors 111, 121, for example.

The user interface 55 is configured with a touch panel, a button, or a voice recognition unit, for example, and detects instructions of the user as an operation signal. In a case that the user interface 55 is the touch panel, the touch panel is arranged on the display panel 21, and is configured with a translucent material so as to transmit light emitted from the display panel 21.

Second Embodiment

Next, an image control method according to a second embodiment of the invention using the above-described correction image generating system will be explained with reference to flowcharts shown in FIGS. 8A to 9B. Here, the image control method shown in the flowcharts is executed by a computer comprising a. CPU, which computer is in the correction image generating system, reading an image control program stored in a ROM, and causing functions of each portion of the correction image generating system shown in FIG. 4 to be demonstrated with a RAM as a working area.

First, by the user touching a predetermined display being displayed in a display portion 20, for example, a CPU of a control portion 40 starts the image control program and executes the image control program such as to cause each portion of a correction image generating system 10 to carry out each step below. In other words, the user can visually recognize portions of display unevenness U1 to U4 produced in a display image displayed in the display portion 20 and execute the image control program at such timing intended by the user himself that he feels he would like to remove it. Specifically, by the user touching a display to "start display unevenness correction" being displayed in the display portion 20 in advance, for example, a user interface 55 generates an operation signal and the CPU executes the image control program based on the operation signal generated.

Figure 8A:
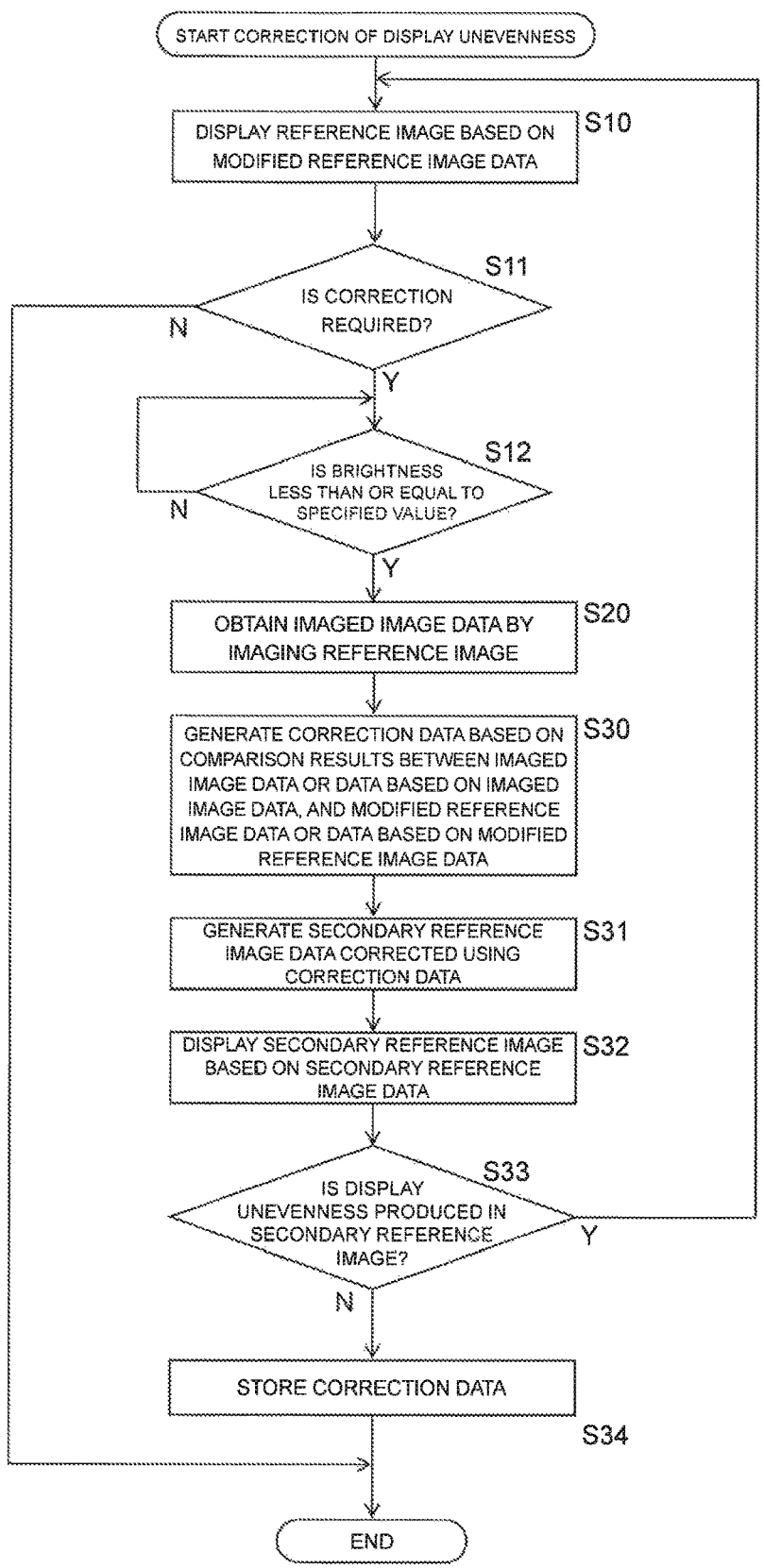
FIG. 8A shows a flowchart of a part of the image control method being a second embodiment of the invention.

Next, the display portion 20 displays a reference image based on modified reference image data (S10 in FIG. 8A). At this time, in the reference image displayed in the display portion 20, initial display unevenness produced in the manufacturing phase of the electronic apparatus is removed. As described above, this initial display unevenness is produced primarily as a result of manufacturing variations of the characteristic of switching elements being the drive switching element 211$d$ and the selection switching element 211$s$ making up the sub-pixel 211. The modified reference image data is stored in advance in a storage portion 48, and the display portion 20 displays the reference image based on the modified reference image data stored. Instead thereof, reference image data can be stored in advance in the storage portion 48, along with the initial correction data. In this case, the image data correcting portion 42 generates the modified reference image data by correcting the reference image data using the initial correction data, and the display portion 20 displays a reference image based on the modified reference image data generated. Data used to display the reference image can be made to be stored in the temporary storage portion 49 at the time of starting the image control program by being read from the storage portion 48. The display portion 20 displays the reference image so as to match the display characteristic of the display panel 21, preferably upon predetermined correction such as gamma correction being carried out on the modified reference image data.

Here, the reference image data used in the embodiment is explained. The reference image data is formed of a plurality of still image data sets and comprises a plurality of image data sets comprising single gradation values, for example. Specifically, in a case that a sub-pixel 211 of a display panel 21 is configured with an R sub-pixel, a G sub-pixel, and a B sub-pixel, the reference image data is preferably an image data group comprising a plurality of image data sets in which image data having a single gradation value for the red color, a single gradation value for the green color, and a single gradation value for the blue color are provided for each of a plurality of different gradation values for each color. For example, in a case that the image data is 8 bits (256 gradations), the reference image data represents image data sets being (a total of nine) three each of the red color, the green color, and the blue color of a gradation value in the neighborhood of the center value of the gradation (for example, the gradation value being 100), a gradation value being greater than the center value of the gradation (for example, the gradation value being 200), and a gradation value being less than the center value of the gradation (for example, the gradation value being 50). In this way, in a case that the reference image data is used, when initial correction data to overcome initial display unevenness is generated in the manufacturing phase of an electronic apparatus, the initial display unevenness is easily recognized visually. Moreover, in a case that there is a large number of reference image data sets, correction value parameters for each of the coordinates described below are accurately generated. However, with too many reference image data sets, it takes time to improve the picture quality of the display image, so that the storage portion 48 preferably stores two to five reference image data sets having a different gradation value for each color. Furthermore, the reference image data can be an image data group having a plurality of image data sets in which grayscale image data having a single gradation value is provided for each of a plurality of different gradation values. As a gray-scale image is configured with the mixed light of emitted lights of a plurality of colors of the sub-pixel 211, as described below, display unevenness of the plurality of colors of the sub-pixel 211 can be specified with a one-time imaging of the reference image, making it possible to reduce the time for the step of generating correction data. In this case, the storage portion 48 preferably stores three to five reference image data sets having different gradation values. Moreover, the reference image data can be image data having regular changes in gradation value, such as image data to display a so-called color bar having a plurality of single-colored band-shaped regions, or image data to carry out a so-called gradation display in which color or shading changes continuously or stepwise, or can be an image data group comprising these image data sets in a plurality.

The modified reference image data is generated by each reference image data set being corrected using the initial correction data. The modified reference image data is data in which the reference image data is corrected using the initial correction data such that the initial display unevenness is removed, so that, as described above, in a case that the reference image data is image data having a single gradation value, correction by the initial correction data causes the modified reference image data to be image data having a plurality of gradation values. Moreover, in a case that the reference image data is image data having a regular change in gradation value, correction by the initial correction data causes the modified reference image data to be image data having an irregular change in gradation value.

Next, the user determines whether a correction to remove display unevenness is required (S11). Specifically, for example, at a time interval after the display portion 20 displays a reference image, an operation image generating portion 47 causes an operation image based on image data in which two operation image data sets such as "correction required" and "correction not required" are superimposed on modified reference image data to be displayed in the display portion 20. Then, in a case that the portions of display unevenness U1 to U4 are confirmed as a result of visually recognizing the reference image displayed in the display portion 20, the user proceeds to S12 by touching the operation image being "correction required". As described above, these portions of display unevenness U1 to U4 are primarily caused by variations in the aging degradation of the light-emitting characteristic of pixel elements such as the organic-EL elements configuring each of the sub-pixels. On the other hand, in a case that the user did not confirm the portions of display unevenness lii to U4, the image control program is completed by the user touching the operation image being "correction not required".

In a case that the user determines the correction to remove display unevenness to be required, an exposure adjusting portion 45 determines whether the brightness is less than or equal to a specified value (S12). Specifically, in a case that the exposure adjusting portion 45 determines the brightness surrounding the correction image generating system 10 to be less than or equal to the specified value, the operation image generating portion 47 causes an operation image using operation image data such as "please image a display image" to be displayed in the display portion 20 based on a brightness determining signal generated by the exposure adjusting portion 45. In this way, the user is urged to image the reference image displayed in the display portion 20. By the user touching the above-mentioned operation image after preparation for imaging the reference image is completed, the user interface 55 generates an operation signal, and the imaging portion 30 is launched by a control signal generated by an operation determining portion 46 based on the operation signal.

On the other hand, in a case that the exposure adjusting portion 45 determines the brightness in the surroundings to exceed a predetermined value, based on a brightness determining signal generated by the exposure adjusting portion 45, the operation image generating portion 47 causes an operation image using operation image data such as "is illumination darkened?" or "did you move to a dark place?", for example, to be displayed in the display portion 20. The user is urged to darken the illumination in the surroundings or to move to a dark place in accordance with the operation image. Then, by the user touching the above-mentioned operation image after he moves to a dark place, for example, the user interface 55 generates an operation signal, and the exposure adjusting portion 45 again determines the brightness by a control signal generated by the operation determining portion 46 based on the operation signal.

Next, the imaging portion 30 obtains imaged image data by imaging the reference image (S20). Obtaining of the imaged image data is automatically started after the imaging portion 30 is launched by the user touching an operation image such as "please image a display image" as described above after S12 is completed. In a case that the modified reference image data is configured with an image data group, obtaining of the imaged image data is carried out by the display portion 20 continuously displaying a plurality of reference images based on a plurality of image data sets configuring the image data group and the image portion 30 imaging each of the reference images. In a case that the correction image generating system 10 is an apparatus configuration as the mobile apparatus 10A, in which the imaging portion 30 is integrally formed with the main body 11 as shown in FIG. 1A, the imaging portion 30 obtains imaged image data generally by imaging a mirror image of a reference image. In other words, the user images the reference image displayed in the display portion 20 by the imaging portion 30 in the state in which he stands in front of a mirror M while carrying the mobile apparatus 10A and has a first surface 11a of the mobile apparatus 10A being reflected on the mirror M. On the other hand, in a case that the correction image generating system 10 is an apparatus configuration as the system 10C in which the imaging portion 30 is formed as the separate apparatus 12 from the main body 11 as shown in FIG. 1C, the imaging portion 30 obtains imaged image data generally by directly imaging a reference image. In other words, the user images the reference image displayed in the display portion 20 by the imaging portion 30 in the state in which he stands such that he opposes the main body 11 while carrying the imaging portion 30. In a case that the correction image generating system 10 is the mobile apparatus 10B in which the imaging portion 30 is freely attached to/detached from the main body 11 as shown in FIG. 1B, the reference image can be imaged using a technique being either one of the former and the latter.

When the imaging portion 30 is launched by a control signal, preferably, a camera shake detecting portion 51 generates a camera shake detecting signal and inputs it to a camera shake correcting portion 43, and, based on the camera shake detecting signal input, the camera shake correcting portion 43 generates a camera shake correcting signal and inputs this camera shake correcting signal to an actuator 33 of the imaging portion 30. In this case, based on the camera shake correcting signal input, the actuator 33 relatively displaces an imaging element 31 or a lens group 32 with respect to the imaging portion 30. This makes it difficult for a so-called "camera shake" to be produced in the imaged image.

Moreover, preferably, a focal point sensor 52 generates a focal point offset detecting signal to input this to a focal point adjusting portion 44, and, based on the focal point offset detecting signal input, the focal point adjusting portion 44 generates a focal point adjusting signal and inputs this to the actuator 33 of the imaging portion 30. In this case, based on the focal point adjusting signal input, the actuator 33 relatively displaces a focus lens of the lens group 32 with respect to the imaging element 31. This makes it difficult for a so-called "out-of-focus blur" to be produced in the imaged image data. Furthermore, the actuator 33 can also displace the focus lens so as to automatically track the subject to continue focusing thereon even when the subject moves in a case that the subject is focused on once. This makes it easy to image a reference image even in a case that the correction image generating system 10 is the mobile apparatus 10A, 10B.

Furthermore, preferably, a brightness sensor 53 generates a brightness detecting signal to input this to the exposure adjusting portion 45, and, based on the brightness detecting signal input, the exposure adjusting portion 45 generates a brightness adjusting signal to input this to the actuator 33 of the imaging portion 30. In this case, based on the brightness adjusting signal input, the actuator 33 adjusts the size of the diaphragm of the diaphragm mechanism and the shutter mechanism of the lens group 32, and the shutter speed, respectively. This allows the gradation value of the imaged image data to be appropriately adjusted and makes it easy to carry out a comparison between imaged image data or data based on the imaged image data, and modified reference image data or data based on the modified reference image data.

After S20, a correction data generating portion 41 generates correction data based on the comparison result between imaged image data or data based on the imaged image data, and modified reference image data or data based on the modified reference image data (S30). S30 can be carried out automatically in the phase in which S20 is completed, or can be carried out by, after S20 is completed, an operation image such as "do you wish to correct display unevenness?" being automatically displayed and the user touching this operation image. Here, in a case that the imaging portion 30 is an apparatus configuration in which the imaging portion 30 is free to be attached to/detached from the main body 11 as shown in FIG. 1B or an apparatus configuration in which the imaging portion 30 is an apparatus being separate from the main body 11 as shown in FIG. 1C, the relative position of the imaging portion 30 with respect to the main body 11 is not fixed. Therefore, in these apparatus configurations, there can be a case in which the reference image is directly imaged (the imaged reference image is not a mirror image) or there can be a case in which a reference image being reflected on the mirror M is imaged (the imaged reference image is a mirror image). However, even in a case of the apparatus configuration as shown in FIG. 1B, when the imaging portion 30 is attached to the main body 11, in the same manner as a case of the apparatus configuration as the mobile apparatus shown in FIG. 1A, the user normally images a reference image being reflected on the mirror M. Then, in the apparatus configuration as shown in FIG. 1B, in a case that the imaging portion 30 is determined to be attached to the main body 11 based on an attachment/detachment detecting signal output from the previously-described attachment/detachment detecting portion 54, an image processing portion 411 of the correction data generating portion 41 can determine that "there is the use of a mirror". Here, "there is the use of a mirror" is to mean that the reference image imaged by the imaging portion 30 is a mirror image, while "there is no use of a mirror" is to mean that the reference image imaged by the imaging portion 30 is not a mirror image. Moreover, even in a case that the imaging portion 30 is an apparatus configuration being integral with the main body 11 as shown in FIG. 1A, the user normally images the reference image being reflected on the mirror M, so the image processing portion 411 can determine that "there is the use of a mirror".

On the other hand, in a case that the imaging portion 30 is determined to be removed from the main body 11 in the apparatus configuration shown in FIG. 1B or in a case of the apparatus configuration shown in FIG. 1C, the image processing portion 411 preferably determines the presence/absence of the use of the mirror M by detecting a recognition mark R being displayed on a display surface 20a of the display portion 20 or provided in a portion around the display surface 20a of the first surface 11a of the main body 11 (a frame portion of the first surface 11a of the main body 11) to make it possible to determine the presence/absence of the use of the mirror M. The "first surface 11a" is a surface from which the display surface 20a of the display portion 20 is exposed in the main body 11. For example, in a case that the recognition mark is displayed on the display surface 20a (not shown), image data having a gradation value being different from a gradation value of a different area only in a specific coordinate area (for example, a coordinate area occupying a certain region in one of four corners of the display surface) is preferably provided as reference image data or modified reference image data. In other words, a specific coordinate area in a reference image displayed on the display surface 20a is to be a recognition mark to detect the presence/absence of the use of the mirror M. Then, the image processing portion 411 determines the presence/absence of the use of the mirror M by detecting a recognition mark displayed on a part of the display surface 20a from imaged image data obtained by the imaging portion 30. Moreover, in a case of the apparatus configuration shown in FIG. 1B or 1C, depending on the state of carrying the imaging portion 30 by the user, the imaging portion 30 can also image a reference image being upside down or image a reference image while it is slanted, so that the recognition mark can be used to detect the orientation of imaged image data (the orientation of the reference image imaged by the imaging portion 30). The reference image data or the modified reference image data can be in the state in which the recognition mark is comprised therein, or, with image data corresponding to the recognition mark being stored in the storage portion 48 separately from the reference image data or the modified reference image data, by superimposing the image data corresponding to the recognition mark onto the reference image data or the modified reference image data at the time the reference image is displayed in the display portion 20, the reference image comprising the recognition mark can be displayed.

In a case that the recognition mark R is provided in the main body 11, the image processing portion 411 determines an orientation of the imaged image data and the presence/absence of the use of the mirror M by detecting the recognition mark R provided in a portion around the display surface 20a from the imaged image data obtained by the imaging portion 30. Here, it is not necessary to provide the recognition mark R additionally to determine the presence/absence of the use of the mirror M and the orientation of the imaged image data. For example, as the recognition mark R, a specific shape, pattern, or color can be printed or imprinted on a portion around the display surface 20a of the first surface 11a of the main body 11. For example, a logo mark being displayed on the first surface 11a can be used as the recognition mark R. In a case of the apparatus configuration as shown in FIG. 1C, the user is likely to directly image the reference image, so that the image processing portion 411 can determine that "there is no use of a mirror" without taking into account the presence/absence of the use of the mirror M. Moreover, in a case that the imaging portion 30 is provided in the main body 11 such that an imaging window of the imaging portion 30 is positioned to be off the vertical and horizontal center lines of the substantially rectangular first surface 11a of the main body 11, the imaging window 30a of the imaging portion 30 can be the recognition mark R.

Then, in a case that the image processing portion 411 determines that "there is the use of a mirror" based on the detection results of the recognition mark R, it preferably carries out an image processing to invert either one of the imaged image data and the reference image data. In a case of the apparatus configuration shown in FIG. 1A, or in a case of the apparatus configuration shown in FIG. 1B, in which case imaged image data is obtained with the imaging portion 30 being attached to the main body 11, the image processing portion 411 can determine in advance that "there is the use of a mirror" at the time of obtaining the imaged image data. Moreover, in a case that the orientation of the imaged image data is different from the orientation of the reference image data (the orientation of the reference image displayed by the display portion 20) as described previously, the image processing portion 411 can carry out an image processing to cause the orientation of the imaged image data to match the orientation of the reference image data. In this case, when the reference image is imaged by the imaging portion 30 being slanted at −θ degrees (θ: an arbitrary angle between 0 degrees and 360 degrees), the image processing portion 411 converts the coordinates of the imaged image data by +θ degrees (rotates the imaged reference image by θ degrees).

In this way, after determining the presence/absence of the use of the mirror M and the orientation of the imaged image data and carrying out an image processing to invert the imaged image data and correct the orientation of the imaged image data in accordance with the apparatus configuration, the image processing portion 411, as shown in FIG. 3, can trim a portion of the reference image from the imaged image data. Below, for convenience of explanations, the imaged image data on which such an image processing is carried out is referred to merely as imaged image data. Moreover, data in which the reference image data is inverted is also referred to merely as reference image data.

In a case that the gradation value of the imaged image data does not sufficiently match the gradation value of the modified reference image data (the contrast of the imaged image being imaged does not match the contrast of the display image being displayed) even when the gradation values of the imaged image data are adjusted by the exposure adjusting portion 45, by multiplying the gradation value of each of the coordinates of the imaged image data by a certain value, a gradation adjusting portion 414 calculates a multiplier value in which the gradation value of the multiplied imaged image data best matches the gradation value of the modified reference image data. In this case, the gradation adjusting portion 414 generates modified imaged image data multiplying the gradation value of each of the coordinates of the imaged image data using the calculated multiplier value. Specifically, by multiplying the gradation value of each of the coordinates of the imaged image data by a multiplier value in which the gradation value of each of the coordinates of the imaged image data best matches the gradation value of each of the coordinates of the modified reference image data, the modified imaged image data is generated. As described above, the imaged image data is a reference image displayed based on modified reference image data after predetermined correction such as gamma correction is carried out, so that predetermined correction such as the gamma correction is carried out also on the modified reference image data to be matched. On the other hand, as described above, in a case that the gradation value of the imaged image data is generated in advance so as to best match the gradation value of the modified reference image data, the gradation adjusting portion 414 does not have to generate the modified imaged image data. In this case, in generating correction parameters for each of the coordinates described below, the imaged image data, not the modified imaged image data, is used.

Next, a gradation difference generating portion 412 generates gradation difference data being the difference, for each of the coordinates, between the modified imaged image data and the modified reference image data. Here, the gradation difference generating portion 412 can generate gradation difference data by extracting the coordinates at which the difference value exceeds an allowable value such that the user does not get sensitive to display unevenness that cannot be visually recognized. In this case, for the coordinates at which the difference value exceeds the allowable value, an actual difference value is stored in the gradation difference table, and, for the coordinates at which the difference value is a gradation value being less than or equal to the allowable value, the difference value being "0" is stored in the gradation difference table. The coordinates at which the value of the gradation difference table is "0" is assumed to be the coordinates at which no initial display unevenness or display unevenness after starting use is produced, so that, for the above-mentioned coordinates, as described below, a correction value generating portion 415 does not generate the correction parameters. The gradation difference generating portion 412 preferably sets the allowable value to be a value between 0.5 σ and 1.0 σ with the standard deviation of the gradation values of all of the coordinates being set to σ, for example.

Thereafter, based on the modified imaged image data input from the gradation adjusting portion 414, from the relationship between the gradation value of the image data and electric power supplied to a pixel element 211e of the sub-pixel 211, the correction value generating portion 415 generates a correction value table in which correction parameters for each of the coordinates are stored. Specifically, the relationship between a data voltage value V input to the sub-pixel 211 and a luminance L of light emitted from the pixel element 211e (below-called "the V-L characteristic") is shown in the graph in FIG. 6. The V-L characteristic of the sub-pixel 211 in which no display unevenness is produced and the characteristic between a gradation value G of gamma-corrected image data and the luminance L of the pixel element 211e that correspond thereto (the G-L characteristic) are obtained by the measurement results of various characteristics in the manufacturing phase of the display portion 20 or the correction image generating system 10 and are stored in the storage portion 48. For example, a V-L characteristic C0 of the sub-pixel 211 in which no display unevenness is produced is represented by [Mathematical equation 1].

$$L = \alpha \times (V - V_0) \qquad \text{[Mathematical equation 1]}.$$

($V_0$: offset voltage, α: gain of V-L curve)

The characteristic between the gradation value G of the gamma-corrected image data and the luminance L (the G-L characteristic) that corresponds to [Mathematical equation 1] is represented by [Mathematical equation 2].

$$L = \beta \times G \qquad \text{[Mathematical equation 2]}$$

($\beta$: gain of G-L curve)

The V-L characteristic C1, C2 of each of the sub-pixels 211 in which display unevenness is produced as a bright portion or a dark portion of display unevenness is represented by [Mathematical equation 3].

$$L = (\alpha + \Delta\alpha) \times (V - (V_0 + \Delta V_0)) \qquad \text{[Mathematical equation 3]}$$

($\Delta V_0$: deviation quantity of offset voltage, $\Delta\alpha$: deviation quantity of gain of V-L curve)

The G-L characteristic corresponding to Mathematical equation 3 is represented by [Mathematical equation 4].

$$L = (\beta + \Delta\beta) \times (G - \Delta G_0) \qquad \text{[Mathematical equation 4]}$$

($\Delta G_0$: deviation quantity of gradation value, $\Delta\beta$: deviation quantity of gain of G-L curve)

Therefore, in the sub-pixel 211 in which display unevenness is produced, the gradation value G of the image data being converted to the gradation value G' shown in [Mathematical equation 5] causes no display unevenness to be produced.

$$G' = \Delta G_0 + (\Delta\beta/(\beta+\Delta\beta)) \times G \qquad \text{[Mathematical equation 5]}$$

In this way, with respect to a multiplier value A ($\Delta\beta/(\beta+\Delta\beta)$ in [Mathematical equation 5]) taking into account the deviation quantity of the gain of the G-L curve, ($\Delta\beta/(\beta+\Delta\beta)$) and an addition value B ($\Delta G_0$ in [Mathematical equation 5]) taking into account the deviation quantity of the gradation value G in the G-L characteristic are calculated. By calculating two types of deviation quantities ($\Delta G_0$, $\Delta\beta$) of the coordinates at which display unevenness in the image data is produced, using [Mathematical equation 4], the correction value generating portion 415 generates correction parameters configured with the multiplier value A and the addition value B to remove display unevenness.

The correction value generating portion 415 carries out generation of correction parameters as follows, for example.

For example, first, the correction value generating portion 415 specifies the coordinates at which initial display unevenness and display unevenness after starting use is produced, at which coordinates the difference value is not "0" in the gradation difference data. Next, in the modified imaged image data and the modified reference image data, the correction value generating portion 415 collates gradation values $G_{U1}$ and $G_{R1}$ for the specified coordinates, respectively (The gradation value $G_{R1}$ indicates a gradation value corresponding to correction being carried out to remove initial display unevenness to be brought to the intended luminance of the sub-pixel 211, while the gradation value $G_{U1}$ indicates a gradation value corresponding to the actual luminance of the sub-pixel 211 being brought to the unintended luminance due to initial display unevenness and display unevenness after starting use). Moreover, using [Mathematical equation 4] and the initial correction parameters corresponding to the coordinates that are to be subjected thereto, the correction value generating portion 415 calculates an intended luminance $L_{R1}$ of the sub-pixel 211 at the gradation value $G_{R1}$ (corresponding to a luminance $L_R$ in a case that a data voltage value V is V1 in the V-L characteristic C1 or C2 in FIG. 6). On the other hand, an actual luminance $L_{U1}$ of the sub-pixel 211 at the gradation value $G_{U1}$ (corresponding to a luminance $L_{U'}$ in a case that the data voltage value V is V1 in the V-L characteristic C1' or C2' being further changed from the V-L characteristic C1 or C2 in FIG. 6) is represented by the [Mathematical equation 6] as the gradation value of the image data is proportional to the luminance L of the sub-pixel 211.

$$L_{U1} = G_{U1}/G_{R1} \times L_{R1} \qquad \text{[Mathematical equation 6]}$$

In this way, it can be calculated as a luminance $L_{U1}$ at the time of the gradation value $G_{R1}$ in the sub-pixel 211 in which display unevenness is produced. Moreover, using the same technique as the above-described technique, a luminance $L_{U2}$ at a different gradation value $G_{R2}$ in the sub-pixel 211 in which display unevenness is produced is calculated. In other words, as there are two correction parameters (A and B) to be determined in [Mathematical equation 4], using the above-described technique, the correction value generating portion 415 obtains two sets of gradation values and current values from two different reference images based on modified reference image data sets having two different gradation values and calculates, for each sub-pixel 211 in which display unevenness is produced, deviation quantities ($\Delta G_0$, $\Delta\beta$) from [Mathematical equation 4]. Then, by further calculating the multiplier value A and the addition value B from the calculated deviation quantities ($\Delta G_0$, $\Delta\beta$) and [Mathematical equation 5], the correction value generating portion 415 generates correction parameters for one sub-pixel 211 and, by carrying this out for each sub-pixel 211 in which display unevenness is produced, generates a correction value table in which is stored correction parameters for the coordinates in image data corresponding to each sub-pixel 211. In a case that the sub-pixel 211 of the display panel 21 is configured with an R sub-pixel, a G sub-pixel, and a B sub-pixel, by imaging two each of a red-colored reference image, a green-colored reference image, and a blue-colored reference image based on the modified reference image data for the red color, the modified reference image data for the green color, and the modified reference image data for the blue color described above, the correction value generating portion 415 obtains two modified imaged data sets for each color and generates correction parameters for each color from the two sets of gradation values and current values thus obtained and [Mathematical equation 4] to [Mathematical equation 6]. The correction value table in which the generated correction parameters are stored is comprised in correction data along with the above-described gradation difference data. In this way, correction data to remove initial display unevenness produced in the manufacturing phase of the electronic apparatus and display unevenness produced after starting use thereof is obtained. The generated correction data is stored in a temporary storage portion 49, for example. With imaged image data being obtained by imaging a reference image displayed using reference image data, the above-described initial correction data is generated, using the same technique thereto, in the manufacturing phase of the electronic apparatus, based on the comparison result between the imaged image data and data based on the imaged image data, and the reference image data and data based on the reference image data. The initial correction data is correction data generated in the manufacturing phase of the electronic apparatus to correct display unevenness produced in the manufacturing phase of the electronic apparatus and is stored in the storage portion 48 in advance.

Here, while two correction parameters are generated assuming that there are two deviation quantities ($\Delta G_0$, $\Delta\beta$) a correction parameter (A or B) can be generated with only one deviation quantity ($\Delta G_0$ or $\Delta\beta$). Each of the multiplier value A and the addition value B depends only on one of the deviation quantities Δβ and ΔG₀, so that, in a case the number of deviation quantities is to be only one, the number of correction parameters is also to be one. In this case, the number of correction parameters to be calculated is one, so that the value of the correction parameter can be generated from one set of voltage value and current value (in other words, one set of imaged image data) and Mathematical equation 2. Moreover, the imaging portion 30 can image a reference image displayed using modified reference image data sets having three or more (n) different gradation values to obtain three or more (n) different imaged image data sets and calculate a plurality of (n−1) deviation quantities (ΔG₀, Δβ) from two sets of gradation values, with the gradation values being in the neighborhood of each other, and current values, and [Mathematical equation 4] to [Mathematical equation 6] to generate correction parameters. In this case, to a gradation value between certain two gradation values in the neighborhood of each other, correction parameters generated using these two sets of gradation values and current values are applied, while, to a gradation value between different two gradation values in the neighborhood of each other, different correction parameters calculated using these two sets of gradation values and current values are applied. In this way, more accurate correction parameters are obtained.

The correction value generating portion 415 can generate correction parameters to correct the G-L characteristic, assuming that the gradation value of reference image data prior to gamma correction matches between the coordinates at which display unevenness is produced and the coordinates at which display unevenness is not produced. In this case, the correction value generating portion 415 generates correction parameters from a G-L characteristic not being gamma corrected, so that it is to generate a correction value table in which is stored correction parameters encompassing gamma correction. Moreover, generation of the correction parameters is not limited to the above-described methods, so that, using an arbitrary function showing the correlation between any two of the gradation value G of reference image data (regardless of prior to or after gamma correction), the data voltage value V, and the luminance L of the sub-pixel 211, a deviation quantity of the function used can be calculated and correction parameters can be generated from the calculated deviation quantity. A CPU can carry out a correction of image data to remove display unevenness in some manner by multiplication or addition using correction parameters.

After S30, an image data correcting portion 42 generates secondary reference image data in which reference image data is corrected using correction data (S31). As shown in FIG. 7, first, the image data correcting portion 42 carries out gamma correction uniformly at each of the coordinates by converting a gradation value in reference image data based on a LUT for gamma correction. At this time, the LUT for gamma correction is preferably stored in the temporary storage portion 49 in advance by being read from the storage portion 48 to increase the image processing speed. In parallel therewith, the image data correcting portion 42 inputs a synchronization signal being synchronized with image data to a coordinate generating portion 421, and the coordinate generating portion 421, based on the input synchronization signal, generates a coordinate signal corresponding to a gradation signal of each of the coordinates comprised in an image signal and inputs the generated coordinate signal to a correction data output portion 422. The correction data output portion 422 reads correction parameters for the coordinates at which is produced display unevenness corresponding to the input coordinate signal from the correction value table being stored in the temporary storage portion 49 to output a multiplier value A and an addition value B to a multiplier 423 and an adder 424, respectively (In S31, unlike the configuration in FIG. 7, the generated correction data is not stored in the storage portion 48 yet). In this way, secondary reference image data in which reference image data is corrected using correction data is obtained.

After S31, the display portion 20 displays a secondary reference image based on the secondary reference image data (S32). As shown in FIG. 4, the secondary reference image data generated in S31 is input to a display drive portion 22 along with the synchronization signal for the secondary reference image data. Thereafter, as shown in FIG. 5, the data line drive portion 22D and the scanning line drive portion 22S of the display drive portion 22 carry out predetermined data processing to generate a data signal and an operation signal, respectively. Then, the display panel 21 is to display a corrected image based on the data signal and the operation signal.

After S32, the user determines whether display unevenness is produced in the secondary reference image (S33). For example, after S32 is completed, the operation image generating portion 47 causes an operation image using two operation image data sets such as "there is display unevenness" and "there is no display unevenness" to be displayed in the display portion 20. Then, by the user touching an operation image being either "there is display unevenness" or "there is no display unevenness" in the operation image, the user interface 55 generates an operation signal, and the operation determining portion 46 generates a control signal according to the operation signal. Moreover, in S32, the presence/absence of display unevenness can be determined automatically by imaging the secondary reference image. Specifically, first, the imaging portion 30 images the secondary reference image to obtain the imaged image data. Next, in the same manner as the above-described technique, the modified imaged image data is generated, and the gradation difference generating portion 412 generates gradation difference data between the modified imaged image data and the modified reference image data. Then, with ±1 gradation value to ±2 gradation value as an allowable value, for example, a display unevenness determining portion 413 can determine that no display unevenness is produced in a case that there are no coordinates exceeding the allowable value in the generated gradation difference data, or t can determine that no display unevenness is produced in a case being otherwise.

In a case that display unevenness is produced in the secondary reference image, the display portion 20 displays a reference image based on modified reference image data to repeat S11 to S33 again in accordance with the operation signal generated by the operation determining portion 46 (S10). At the time of repeating for the second time and thereafter, at least one of S11 and S12 can be omitted. In a case that no display unevenness is produced in the secondary reference image, in accordance with the operation signal generated by the operation determining portion 46, the correction value generating portion 415 stores correction data used in correcting reference image data in the storage portion 48 (S34). In addition, the correction value generating portion 415 can store, in the storage portion 48, data in which reference image data is corrected by the correction data, or the modified reference image data can be replaced with data in which the modified reference image data is corrected by the correction data. In this way, the process of generating correction data is completed.

Figure 8B:
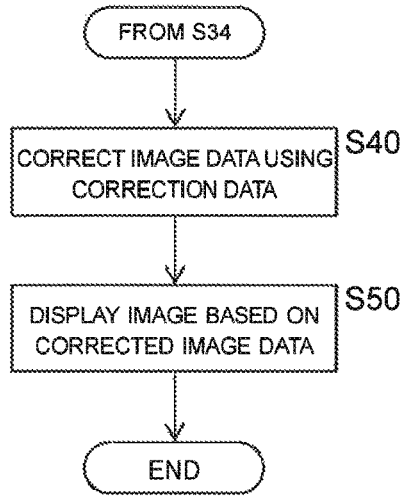
FIG. 8B shows a flowchart of a part of the image control method being the second embodiment of the invention.
Figure 9:
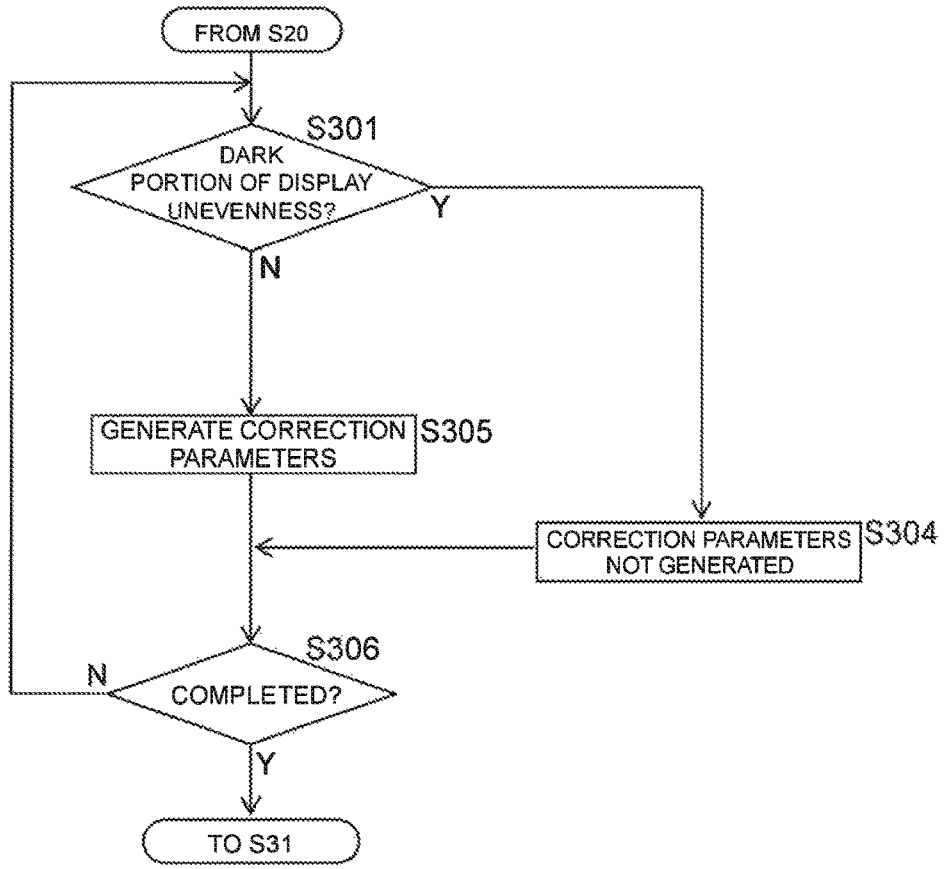
FIG. 9 shows a flowchart of a part of the image control method being a third embodiment of the invention.

After S34, using the same technique as in S30, the image data correcting portion 42 corrects arbitrary image data using the latest correction data stored in the storage portion 48 (S40 in FIG. 8B). Here, arbitrary image data refers to all of the image data sets corresponding to the display image displayed by the display portion 20 after S34 and comprises both image data for still image and image data for video. At this time, correction data obtained according to the embodiment removes, not only display unevenness produced in the manufacturing phase of the electronic apparatus, but also display unevenness produced after starting use thereof. Then, according to the same step as in the above-described technique, up to the time new correction data is stored in the storage portion 48, the image data correcting portion 42 corrects the image data using the above-mentioned correction data.

As described above, the temporary storage portion 49 is configured with a volatile storage medium, so that, when the power of the electronic apparatus is turned off, the stored correction value table is erased. However, when the power of the electronic apparatus is turned on, the image data correcting portion 42 reads the correction value table from the storage portion 48 to cause it to be stored in the temporary storage portion 49. In this way, during the operation of the electronic apparatus, the image data correcting portion 42 can read the correction data from a storage medium having a greater read speed, allowing the image processing speed of the image data to correct display unevenness to be increased. On the other hand, when the power of the electronic apparatus is turned off, the latest correction data being continually stored in the storage portion 48 configured with a non-volatile storage medium makes generation of the correction data each time the power of the electronic apparatus is turned on unnecessary. However, the image data correcting portion 42 can read the latest correction value table directly from the storage portion 48 and output it to the multiplier 423 and the adder 424 to correct the image data. This makes it unnecessary to provide the temporary storage portion 49. In a case that the temporary storage portion 49 stores the correction data, the data to be stored can be, not only the correction value table as described above, but also all the data sets configuring the correction data.

After S40, the display portion 20 displays an image based on the corrected image data (S50). In this way, a display image in which not only initial display unevenness produced in the manufacturing phase, but also display unevenness due to the aging degradation after starting use is removed is displayed in the display portion 20.

According to the correction image generating system, the image control method, and the image control program thus configured, the display portion 20 displays a reference image based on modified reference image data in which reference image data is corrected by initial correction data generated in the manufacturing phase of an electronic apparatus. Therefore, at the time of seeking to generate correction data to remove display unevenness, in the display portion 20, a reference image reflecting initial display unevenness already removed by the initial correction data is not displayed, and a reference image reflecting only display unevenness produced after starting use is displayed. Therefore, the user can suitably become aware of the aging degradation after starting use of the electronic apparatus resulting from the aging degradation of the pixel element 211e such as an organic-EL element, making it possible to cause the correction data generating portion 41 to generate correction data at an appropriate time at which correction of a display image is needed.

Moreover, the correction data generating portion 41 to generate correction data and the image data correcting portion 42 to correct image data using the correction data are provided, in the main body 11, integrally with the display portion 20, so that, regardless of whether the correction image generating system 10 has an apparatus configuration comprising the imaging portion 30 integrally with the main body 11, the picture quality of the display portion 20 in which the aging degradation has occurred can be improved any number of times by executing an image control program at timings intended by the user operating the main body 11. In other words, in the phase in which the main body 11 is delivered to the user, initial correction data generated to remove initial display unevenness produced in the display portion 20 in the manufacturing phase is stored in the storage portion 48 of the main body 11. Therefore, using the initial correction data, an image in which the initial display unevenness is removed is displayed in the display portion 20. However, accompanying the difference in aging degradation in the pixel element 211e of the display panel 21, display unevenness in the display portion 20 is produced again. In such a case, when the user becomes aware of display unevenness of the display portion 20, execution of the image control program allows the correction data generating portion 41 to generate correction data based on the comparison result of the imaged image data or the modified imaged image data and the modified reference image data and the image data correcting portion 42 to correct all the image data sets thereafter by the correction data. In this way, the user can remove, in addition to initial display unevenness produced in the manufacturing phase of the electronic apparatus, display unevenness in the display portion 20, which display unevenness is produced after starting use thereof any number of times.

In a case that correction data is generated a plurality of times to remove display unevenness after starting use, correction data generated prior thereto can be deleted. Alternatively, newly generated correction data can be replaced with the previous correction data. However, the initial correction data is preferably not deleted to remove the initial display unevenness and to be able to restore it to the state at the time of shipment of the electronic apparatus at any time. Moreover, each time a series of steps S10 to S34 is completed, the storage portion 48 can store data in which reference image data is corrected by correction data newly generated and, in a case that the storage portion 48 stores the modified reference image data, the modified reference image data can be replaced with the data in which the reference image data is corrected by the correction data.

Moreover, the correction data generating portion 41 does not generate correction data to correct the initial display unevenness produced in the manufacturing phase of the electronic apparatus and the display unevenness produced after starting use of the electronic apparatus as respectively separate data sets, but generates the correction data to correct the above-mentioned display unevennesses as data being collected as one. Therefore, the image data correcting portion 42 can correct the image data using a single data set, not a plurality of data sets, allowing the burden on the correction data generating portion 41 at the time of correcting the image data to be reduced. Therefore, the image data can be corrected while stably operating the electronic apparatus.

Moreover, the initial correction data is generated in the manufacturing phase and correction data thereafter is generated in the use phase based on the same image control program stored in the storage portion 48 of the main body 11, so that the need to take into account the compatibility between the initial correction data and the correction data thereafter is eliminated.

In a case that correction data is read from the temporary storage portion 49, the image data correcting portion 42 reads the correction data from a storage medium having a greater read speed to increase the image processing speed to correct display unevenness, allowing correction of image data to be carried out smoothly even in a case of image data such as video, which image data has a large data size. On the other hand, in a case that correction data is read from the storage portion 48, there is no need to provide the temporary storage portion 49, simplifying the configuration of the correction image generating system 10.

Third Embodiment

In the image control method according to a third embodiment of the invention, in S30 in the second embodiment, the correction value generating portion 415 generates correction data by adjusting the gradation value of the bright portion of display unevenness and maintaining the gradation value of the dark portion of display unevenness in imaged image data. With respect to the above, the embodiment is explained based on a flowchart shown in FIG. 9. The embodiment is different from the second embodiment in the step to generate correction data (S30), so that only the different points will be explained below.

First, after S20, in the same manner as in the third embodiment, based on gradation difference data input from the gradation difference generating portion 412, the display unevenness determining portion 413 determines, for the coordinates at which initial display unevenness, and display unevenness after starting use are produced, whether display unevenness is a bright portion or a dark portion (S301).

Specifically, the display unevenness determining portion 413 is to determine that there is no display unevenness for the coordinates at which the value of gradation difference data is 0, that there is a bright portion of display unevenness for the coordinates at which the value of gradation difference data is a positive value, and that there is a dark portion of display unevenness for the coordinates at which the value of gradation difference data is a negative value.

In a case the display unevenness determining portion 413 determines display unevenness at the above-mentioned coordinates to be a dark portion in S301, the correction value generating portion 415 does not generate correction parameters at the above-mentioned coordinates in the same manner as for the coordinates in which no display unevenness is produced (S304). On the other hand, in a case being otherwise (in other words, in a case the display unevenness determining portion 413 determines it to be a bright portion of display unevenness in S301), the correction value generating portion 415 generates correction parameters as described above (S305).

After S304 and S305, the correction value generating portion 415 determines, for all of the coordinates in which display unevenness is produced, whether generation of the correction parameters is completed (S306). In a case that it is completed, it executes S31 shown in FIG. 8A, while, in a case that it is not completed, the correction value generating portion 415 carries out S301 for the coordinates in which the generation of the correction parameters is not completed.

In the embodiment having such a configuration, while correction parameters are generated for both the coordinates being the bright portion of display unevenness and the coordinates being the dark portion of display unevenness according to the second embodiment, no correction parameter is generated for the coordinates being the dark portion of display unevenness. In other words, in the sub-pixel 211 corresponding to the coordinates being the dark portion of display unevenness, the aging degradation of the light-emitting characteristic of the pixel element 211e is expected to proceed in the future. To cause such a pixel element 211e to emit light in the same manner as the other elements, it is necessary to correct the gradation value of image data so as to supply electric power being greater than that for the other elements. The above-mentioned correction of image data will cause the degradation of the pixel element 211e to be promoted. According to the embodiment, no correction is carried out on the gradation value in image data corresponding to such a sub-pixel 211, so that the promotion of the aging degradation is suppressed.

Image control other than that according to the embodiment can be carried out, so that, for example, in S30, the correction value generating portion 415 can generate correction data by adjusting the gradation value of the dark portion of display unevenness and maintaining the gradation value of the bright portion of display unevenness in the imaged image data. In this case, display unevenness being dark, which display unevenness is highly visible as display unevenness, is removed, making it possible to efficiently improve the picture quality of an image displayed in the display portion 20.

Other Embodiments

The image control method according to second and third embodiments are realized by a computer comprised in the correction image generating system 10 using an image control program provided in advance. The image control program can be recorded, not only in a ROM being the storage portion 48 comprised in the correction image generating system 10 as described above, but in a computer-readable non-transitory recording media such as a CD-ROM, a DVD-ROM, a semiconductor memory, a magnetic disk, an opto-magnetic disk, and a magnetic tape. The image control program is executed by being read from the recording media by the computer. Moreover, the image control program can be a transmission media that can be distributed via a network such as the Internet.

CONCLUSION

A correction image generating system according to mode 1 of the invention comprises: a main body of an electronic apparatus, which main body comprises a display portion, a storage portion having stored therein predetermined image data being reference image data corrected, a correction data generating portion to generate correction data using a reference image to be displayed in the display portion, and an image data correcting portion to correct image data using the correction data; and an imaging portion to obtain imaged image data by imaging the reference image, wherein the predetermined image data is modified reference image data in which the reference image data is corrected by initial correction data generated in a manufacturing phase of the electronic apparatus; the display portion displays the reference image based on the modified reference image data; and the correction data generating portion generates the correction data based on a comparison result between the imaged image data or data based on the imaged image data, and the modified reference image data or data based on the modified reference image data.

According to the configuration of mode 1 of the invention, a reference image reflecting only display unevenness produced after starting use, not reflecting display unevenness in a manufacturing phase of an electronic apparatus, is displayed in a display portion, so that the user can suitably become aware of the aging degradation of an electronic apparatus after starting use thereof. In this way, the user can cause a correction data generating portion to generate correction data at an appropriate time at which correction of a display image is necessary. Moreover, the correction data generating portion generates correction data to correct the initial display unevenness produced in the manufacturing phase of the electronic apparatus and the display unevenness produced after starting use of the electronic apparatus as data being collected as one, allowing the burden on the correction data generating portion at the time of correcting image data to be reduced. Therefore, the image data can be corrected while stably operating the electronic apparatus.

In the correction image generating system according to mode 2 of the invention, preferably, the reference image data is image data having a singular gradation value, and the modified reference image data is image data having a plurality of gradation values in the above-described mode 1.

According to the configuration of mode 2 of the invention, a correction data generating portion can appropriately generate correction data to remove display unevenness by using simple reference image data, allowing the burden on a correction image generating system to be reduced.

In the correction image generating system according to mode 3 of the invention, preferably, the reference image data is image data having a regular change in gradation value and the modified reference image data is image data having an irregular change in gradation value in the above-described mode 1.

According to the configuration of mode 3 of the invention, a correction data generating portion can appropriately generate correction data to remove display unevenness by using simple reference image data, allowing the burden on a correction image generating system to be reduced.

In the correction image generating system according to mode 4 of the invention, the storage portion preferably is a rewritable non-volatile storage medium in any one of the above-described modes 1 to 3.

The configuration of mode 4 of the invention makes it possible to continue storing various data sets such as correction data generated as appropriate in a non-volatile storage portion even after operation of a correction image generating system. In this way, a correction data generating system can use data stored in the storage portion even at the time of the following operation.

The correction image generating system according to mode 5 of the invention preferably further comprises a temporary storage portion being volatile, the read speed at which stored data is read of which temporary storage portion is greater than that of the storage portion in the above-described mode 4.

According to the configuration of mode 5 of the invention, storing necessary data in a temporary storage portion causes the operating speed of a correction image generating system to increase, making the operation of the correction image generating system smooth.

In the correction image generating system according to mode 6 of the invention, preferably, the storage portion stores the correction data generated by the correction data generating portion; the temporary storage portion temporarily stores the correction data by reading the correction data from the storage portion during an operation of the electronic apparatus; and the image data correcting portion corrects the image data by reading the correction data stored in the temporary storage portion in the above-described mode 5.

According to the configuration of mode 6 of the invention, an image data correcting portion reads correction data, not from a storage portion, but from a temporary storage portion, increasing the image processing speed for correcting image data using correction data. Therefore, correction of the image data is carried out smoothly.

An image control method according to mode 7 of the invention comprises: a first step of displaying a reference image based on predetermined image data; a second step of obtaining imaged image data by imaging the reference image; a third step of generating correction data using the imaged image data; and a fourth step of correcting image data using the correction data, wherein the predetermined image data is modified reference image data in which reference image data is corrected by initial correction data generated in a manufacturing phase of an electronic apparatus comprising a display portion to display the reference image; and the correction data is generated based on a comparison result between the imaged image data or data based on the imaged image data, and the modified reference image data or data based on the modified reference image data.

According to the configuration of mode 7 of the invention, a reference image reflecting only display unevenness produced after starting use, not reflecting display unevenness in the manufacturing phase of an electronic apparatus, is displayed, so that the user can suitably become aware of the aging degradation of the electronic apparatus after starting use thereof. In this way, the user can generate correction data at an appropriate time at which correction of a display image is needed. Moreover, correction data to correct initial display unevenness produced in the manufacturing phase of the electronic apparatus and display unevenness produced after starting use of the electronic apparatus is generated as data being collected as one, allowing the burden on the electronic apparatus at the time of correcting image data to be reduced. Therefore, the image data can be corrected while stably operating the electronic apparatus.

In the image control method according to mode 8 of the invention, in the third step, the correction data to adjust a gradation value of a bright portion of display unevenness and to maintain a gradation value of a dark portion of display unevenness in the imaged image data is preferably generated in the above-described mode 7.

According to the configuration of mode 8 of the invention, the aging degradation of the display characteristic in a display portion of a portion making up a dark portion of display unevenness after starting use in which aging degradation is expected to be in progress is suppressed.

In the image control method according to mode 9 of the invention, in the third step, the correction data to adjust a gradation value of a dark portion of display unevenness and to maintain a gradation value of a bright portion of display unevenness in the imaged image data is preferably generated in the above-described mode 7.

According to the configuration of mode 9 of the invention, display unevenness being dark, which display unevenness is highly visible as display unevenness, is removed, making it possible to efficiently improve the picture quality of an image displayed in a display portion.

In the image control method according to mode 10 of the invention, in the third step, the correction data to adjust both a gradation value of a bright portion of display unevenness and a gradation value of a dark portion of display unevenness in the imaged image data is preferably generated in the above-described mode 7.

According to the configuration of mode 10 of the invention, both bright and dark portions of display unevenness are removed, making it possible to substantially improve the picture quality of an image displayed in a display portion.

An image control program according to mode 11 of the invention, in an image control program to cause display unevenness of an image to be corrected in a correction image generating system comprising: a main body of an electronic apparatus, which main body comprises a display portion to display the image based on image data, a storage portion having stored therein predetermined image data being reference image data corrected, a correction data generating portion to generate correction data of the age data, and an image data correcting portion to correct the image data; and an imaging portion to image a subject, the predetermined image data being modified reference image data in which the reference image data is corrected by initial correction data generated in a manufacturing phase of the electronic apparatus, causes the correction image generating system to execute therein a first step of causing the display portion to display a reference image based on the modified reference image data; a second step of causing the imaging portion to obtain imaged image data by causing the imaging portion to image the reference image; a third step of causing the correction data generating portion to generate the correction data based on a comparison result between the imaged image data or data based on the imaged image data, and the modified reference image data or data based on the modified reference image data; and a fourth step of causing the image data correcting portion to correct the image data using the correction data.

According to the configuration of mode 11 of the invention, a reference image reflecting only display unevenness produced after starting use, not reflecting display unevenness produced in the manufacturing phase of an electronic apparatus is displayed in a display portion, so that the user can suitably become aware of the aging degradation of the electronic apparatus after starting use thereof. In this way, the user can cause a correction data generating portion to generate correction data at an appropriate time at which correction of a display image is needed. Moreover, the correction data generating portion generates correction data to correct initial display unevenness produced in the manufacturing phase of the electronic apparatus and display unevenness produced after starting use of the electronic apparatus as data being collected as one, allowing the burden on the correction data generating portion at the time of generating the correction data to be reduced. Therefore, image data can be corrected while stably operating the electronic apparatus.

A storage medium according to mode 12 of the invention is a computer-readable non-transitory storage medium having stored therein the image control program according to mode 11.

According to the configuration of mode 12 of the invention, executing an image control program being stored can cause a correction data generating portion to generate correction data any number of times at timings intended by the user operating a main body. Therefore, this makes it possible to cause the picture quality of a display portion in which the aging degradation has occurred degraded to be improved using image data caused to be corrected using correction data by an image data correcting portion.

DESCRIPTION OF LETTERS

10 CORRECTION IMAGE GENERATING SYSTEM
11 MAIN BODY
20 DISPLAY PORTION
30 IMAGING PORTION
40 CONTROL PORTION
41 CORRECTION DATA GENERATING PORTION
42 IMAGE DATA CORRECTING PORTION
48 STORAGE PORTION
49 TEMPORARY STORAGE PORTION
U1, U4 DARK PORTION OF DISPLAY UNEVENNESS
U2, U3 BRIGHT PORTION OF DISPLAY UNEVENNESS

The invention claimed is:

1. A correction image generating system comprising:
a main body of an electronic apparatus, which main body comprises a display portion, a storage portion having stored therein predetermined image data being reference image data corrected, a correction data generating portion to generate correction data using a reference image to be displayed in the display portion, and an image data correcting portion to correct image data using the correction data; and
an imaging portion to obtain imaged image data by imaging the reference image, wherein
the predetermined image data is modified reference image data in which the reference image data is corrected by initial correction data, which initial correction data is the correction data generated in a manufacturing phase of the electronic apparatus;
the display portion displays the reference image based on the modified reference image data;
in the manufacturing phase of the electronic apparatus, the correction data generating portion generates the initial correction data being the correction data based on a comparison result between the imaged image data or data based on the imaged image data, and the reference image data or data based on the reference image data, and after starting use of the electronic apparatus, the correction data generating portion generates latest correction data being the correction data based on a comparison result between the imaged image data or data based on the imaged image data, and the modified reference image data or data based on the modified reference image data; and
in a case that the correction data generating portion generates the latest correction data, the image data correcting portion corrects the image data using the latest correction data out of the correction data.

2. The correction image generating system according to claim 1, wherein the reference image data is image data having a singular gradation value, and the modified reference image data is image data having a plurality of gradation values.

3. The correction image generating system according to claim 1, wherein the reference image data is image data having a regular change in gradation value and the modified reference image data is image data having an irregular change in gradation value.

4. The correction image generating system according to claim 1, wherein the storage portion is a rewritable non-volatile storage medium.

5. The correction image generating system according to claim 4, further comprising a temporary storage portion being volatile, the read speed at which stored data is read of which temporary storage portion is greater than that of the storage portion.

6. The correction image generating system according to claim 5, wherein
the storage portion stores the correction data generated by the correction data generating portion;
the temporary storage portion temporarily stores the correction data by reading the correction data from the storage portion during an operation of the electronic apparatus; and
the image data correcting portion corrects the image data by reading the correction data stored in the temporary storage portion.

7. An image control method comprising:
a first step of displaying a reference image based on predetermined image data;
a second step of obtaining imaged image data by imaging the reference image;
a third step of generating correction data using the imaged image data; and
a fourth step of correcting image data using the correction data, wherein
the predetermined image data is modified reference image data in which reference image data is corrected by initial correction data, which initial correction data is the correction data generated in a manufacturing phase of an electronic apparatus comprising a display portion to display the reference image;
in the third step, in the manufacturing phase of the electronic apparatus, the initial correction data being the correction data is generated based on a comparison result between the imaged image data or data based on the imaged image data, and the reference image data or data based on the reference image data, and after starting use of the electronic apparatus, latest correction data being the correction data is generated based on a comparison result between the imaged image data or data based on the imaged image data, and the modified reference image data or data based on the modified reference image data; and
in a case that the latest correction data is generated in the third step, the image data is corrected using the latest correction data out of the correction data in the fourth step.

8. The image control method according to claim 7, wherein, in the third step, the correction data to adjust a gradation value of a bright portion of display unevenness and to maintain a gradation value of a dark portion of display unevenness in the imaged image data is generated.

9. The image control method according to claim 7, wherein, in the third step, the correction data to adjust a gradation value of a dark portion of display unevenness and to maintain a gradation value of a bright portion of display unevenness in the imaged image data is generated.

10. The image control method according to claim 7, wherein, in the third step, the correction data to adjust both a gradation value of a bright portion of display unevenness and a gradation value of a dark portion of display unevenness in the imaged image data is generated.

11. A computer-readable non-transitory storage medium having stored therein an image control program to cause display unevenness of an image to be corrected in a correction image generating system comprising: a main body of an electronic apparatus, which main body comprises a display portion to display the image based on image data, a storage portion having stored therein predetermined image data being reference image data corrected, a correction data generating portion to generate correction data of the image data, and an image data correcting portion to correct the image data; and an imaging portion to image a subject, wherein
the predetermined image data being modified reference image data in which the reference image data is corrected by initial correction data being the correction data generated in a manufacturing phase of the electronic apparatus, the image control program to cause the correction image generating system to execute therein
a first step of causing the display portion to display a reference image based on the modified reference image data;
a second step of causing the imaging portion to obtain imaged image data by causing the imaging portion to image the reference image;
a third step of causing the correction data generating portion, in the manufacturing phase of the electronic apparatus, to generate the initial correction data being the correction data based on a comparison result between the imaged image data or data based on the imaged image data, and the reference image data or data based on the reference image data, and after starting use of the electronic apparatus, to generate latest correction data being the correction data based on a comparison result between the imaged image data or data based on the imaged image data, and the modified reference image data or data based on the modified reference image data; and
a fourth step of causing the image data correcting portion to correct the image data using the correction data; wherein,
in a case that the image control program causes the correction data generating portion to generate the latest correction data in the third step, the image control program causes the image data correcting portion to correct the image data using the latest correction data out of the correction data in the fourth step.

* * * * *